(12) United States Patent
Wasserman et al.

(10) Patent No.: US 7,042,452 B1
(45) Date of Patent: May 9, 2006

(54) TRIANGLE COVERAGE ESTIMATION AND EDGE-CORRECT TESSELLATION

(75) Inventors: Michael A. Wasserman, Redwood City, CA (US); Ranjit S. Oberoi, Saratoga, CA (US); David C. Kehlet, Los Altos, CA (US); Te-Chun Yu, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 386 days.

(21) Appl. No.: 10/677,671

(22) Filed: Oct. 2, 2003

(51) Int. Cl.
*G06T 15/30* (2006.01)

(52) U.S. Cl. ............... 345/423; 345/419; 345/420

(58) Field of Classification Search ............ 345/423
See application file for complete search history.

(56) References Cited

U.S. PATENT DOCUMENTS

| | | | |
|---|---|---|---|
| 6,184,908 B1* | 2/2001 | Chan et al. | 345/522 |
| 6,879,328 B1* | 4/2005 | Deering | 345/592 |
| 6,914,610 B1* | 7/2005 | Lavelle et al. | 345/581 |
| 6,952,214 B1* | 10/2005 | Naegle et al. | 345/506 |
| 2002/0180747 A1 | 12/2002 | Lavelle et al. | |
| 2003/0142104 A1 | 7/2003 | Lavelle et al. | |
| 2004/0183807 A1* | 9/2004 | Emberling et al. | 345/552 |

* cited by examiner

*Primary Examiner*—Kimbinh T. Nguyen
*Assistant Examiner*—Said Broome
(74) *Attorney, Agent, or Firm*—Meyertons Hood Kivlin Kowert & Goetzel, P.C.

(57) ABSTRACT

A graphics system invokes a dicing process if one or more edges of a triangle T have length greater than a maximum length ($L_{MAX}$), invokes a central subdivision process if a coverage estimate for the triangle T is greater than a maximum coverage and all edges of triangle T have length less than or equal to $L_{MAX}$, invokes rendering of a sequence of one or more single-layer triangles based on triangle T if the coverage estimate for triangle T is less than or equal to the maximum coverage and all edges have length less than or equal to $L_{MAX}$. Said invocation of rendering of the sequence of single-layer triangles results in the application of a plurality of texture layers to samples corresponding to triangle T. The samples are stored in the TAB between the application of successive layers of said plurality of texture layers.

34 Claims, 22 Drawing Sheets

TRIANGLE COVERAGE ESTIMATION AND EDGE-CORRECT TESSELLATION

BACKGROUND OF THE INVENTION

1. Field of the Invention

This invention relates generally to the field of computer graphics and, more particularly, to a system and method for applying multiple layers of texture information to 3D triangles.

2. Description of the Related Art

Graphics programs often demand the application of multiple layers of texture information to 3D triangles. Many prior art graphics systems capable of multi-texturing triangles have too low a ratio of performance to cost to satisfy many graphics users/programmers. Thus, there exists a significant need for a graphics system and methodology capable of performing triangle multi-texturing in an efficient manner.

SUMMARY

In one set of embodiments, a graphics system may be configured to perform multi-texturing of graphics primitives such as triangles. The graphics system may include a rasterization pipeline and a vertex processor. The vertex processor may be configured to receive vertices of a triangle T. The vertex processor may:

(a) compute a length (e.g., an $L^1$ length, or alternatively, an $L^\infty$ length) for each edge of the triangle T,
(b) compute a perimeter of the triangle T,
(c) compute a geometric area of the triangle T,
(d) add the geometric area and a scalar multiple of the perimeter to determine a coverage estimate for the triangle T,
(e) invoke execution of a dicing process if one or more edges of the triangle T have length greater than a maximum length,
(f) invoke execution of a central subdivision process if the coverage estimate is greater than a maximum coverage and all edges have length less than or equal to the maximum length, and
(g) forward a set of one or more single-layer triangles based on the triangle T to the rasterization pipeline if the triangle T has coverage estimate less than or equal to the maximum coverage and all edges have length less than or equal to the maximum length.

A subdivision process is said to be a dicing process if it subdivides the triangle T into component triangles in a manner that cuts one or more edges of the triangle T. A subdivision process is said to be a central subdivision process if it subdivides the triangle into component triangles in a manner that preserves the edges of the triangle T; in other words, the edges of the triangle T appear as edges of the component triangles.

Each of the single-layer triangles contains texture information relating to a corresponding layer of texture stored in a texture memory, and induces the application of texel data from the corresponding layer to samples corresponding to the triangle T. The samples are stored in a texture accumulation buffer between the application of successive texture layers. The maximum coverage may equal a sample capacity of the TAB.

In response to receiving each of the single-layer triangles, the rasterization pipe is configured to generate a texture coordinate vector $VEC_B$ and a set $S_B$ of sample fill parameters for each candidate bin B of the single-layer triangle. The graphics system may also include a texture environment unit. The texture environment unit may receive a set of one or more texture values generated in response to the texture coordinate vector $VEC_B$, and apply the set of texture values to samples corresponding to the candidate bin B to produce modified samples. The texture environment unit is operable to receive the samples corresponding to candidate bin B from a texture accumulation buffer and/or from a sample fill unit. The sample fill unit is configured to generate samples in response to the sample fill parameters $S_B$. The texture environment unit is configured to store the modified samples into the texture accumulation buffer.

The vertex processor may be configured to compute the geometric area according to a cross product expression, and to compute the perimeter of the triangle T as a sum of $L^\infty$ lengths of the triangle edges. Furthermore, the vertex processor may be configured to compute the coverage estimate by multiplying the perimeter by a scalar (e.g., two) to obtain a scalar multiple of the perimeter, adding the scalar multiple to the geometric area to form a resultant sum, and multiplying the resultant sum by a sample density In another set of embodiments, a method for multi-texturing graphics primitives (e.g., triangles) may be include the operations of:

(a) receiving vertices of a polygon P;
(b) invoking a dicing process if one or more edges of the polygon P have length (e.g., Manhattan length, or alternatively, an $L^\infty$ length) greater than a maximum length;
(c) invoking a central subdivision process if a coverage estimate for the polygon P is greater than a maximum coverage and all edges of the polygon P have length less than or equal to the maximum length;
(d) invoking rendering of a set of one or more single-layer triangles based on the polygon P if the coverage estimate for the polygon P is less than or equal to the maximum coverage and all edges have length less than or equal to the maximum length.

Operation (d) results in the application of a plurality of texture layers to samples corresponding to the polygon P. The samples are stored in a texture accumulation buffer between the application of successive layers of the plurality of texture layers. The maximum coverage and maximum length are based on a sample capacity of the texture accumulation buffer.

In yet another set of embodiments, a graphical computing system may include a texture accumulation buffer and a vertex processor. The vertex processor may be configured to:

(a) receive vertices of a triangle T;
(b) invoke a dicing process if one or more edges of the triangle T have first length greater than a maximum length;
(c) invoke a central subdivision process if a coverage estimate for the triangle T is greater than a maximum coverage and all edges of the triangle T have first length less than or equal to the maximum length; and
(d) invoke rendering of a sequence of one or more single-layer triangles based on the triangle T if the coverage estimate for the triangle T is less than or equal to the maximum coverage and all edges have first length less than or equal to the maximum length.

Step (d) results in the application of texel data from a plurality of stored texture layers to samples corresponding to the triangle T, one layer per single-layer triangle. The samples are stored in the texture accumulation buffer between the application of successive layers of the plurality of texture layers.

BRIEF DESCRIPTION OF THE DRAWINGS

A better understanding of the present invention can be obtained when the following detailed description is considered in conjunction with the following drawings, in which.

Figure 1:
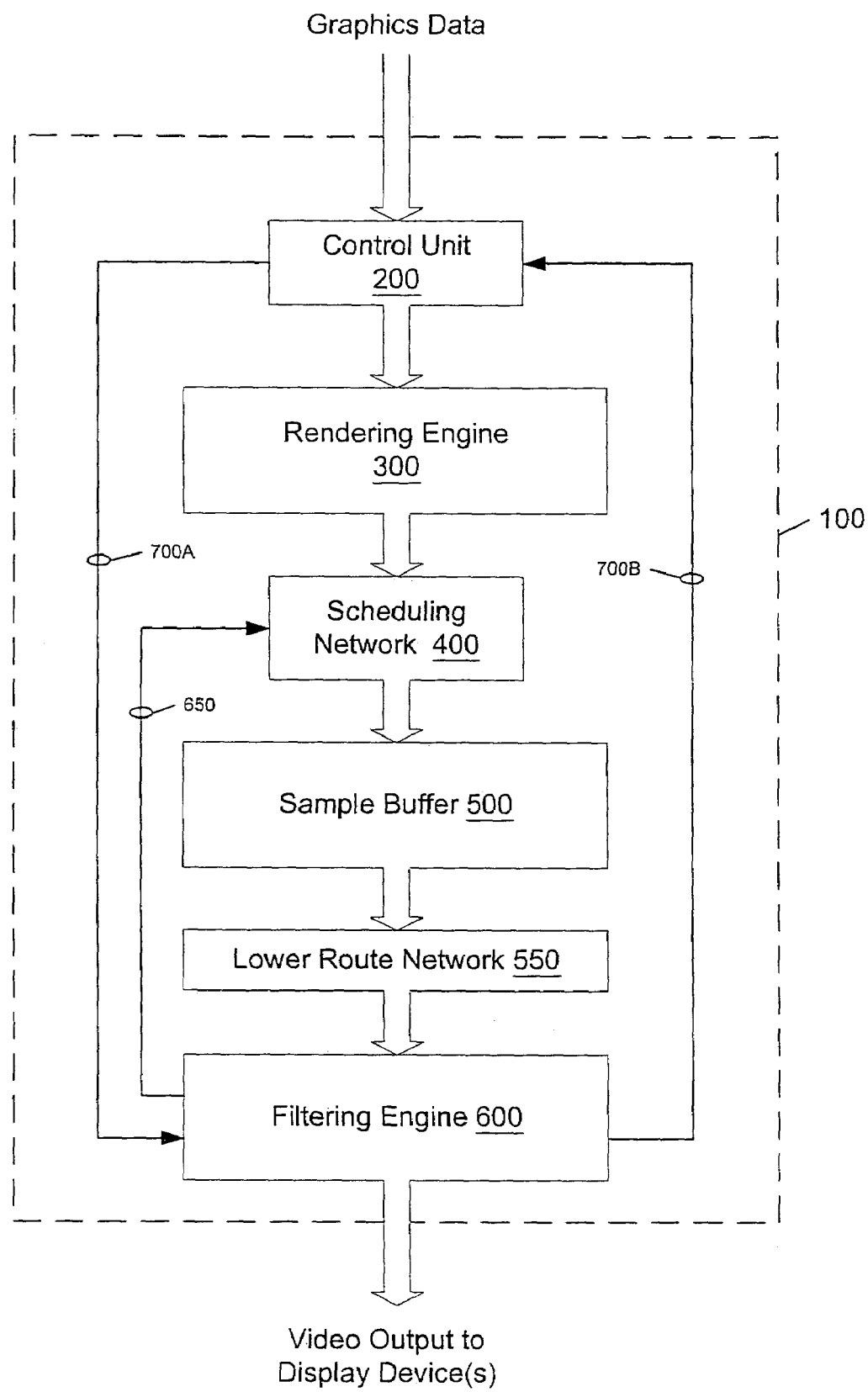
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly; or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
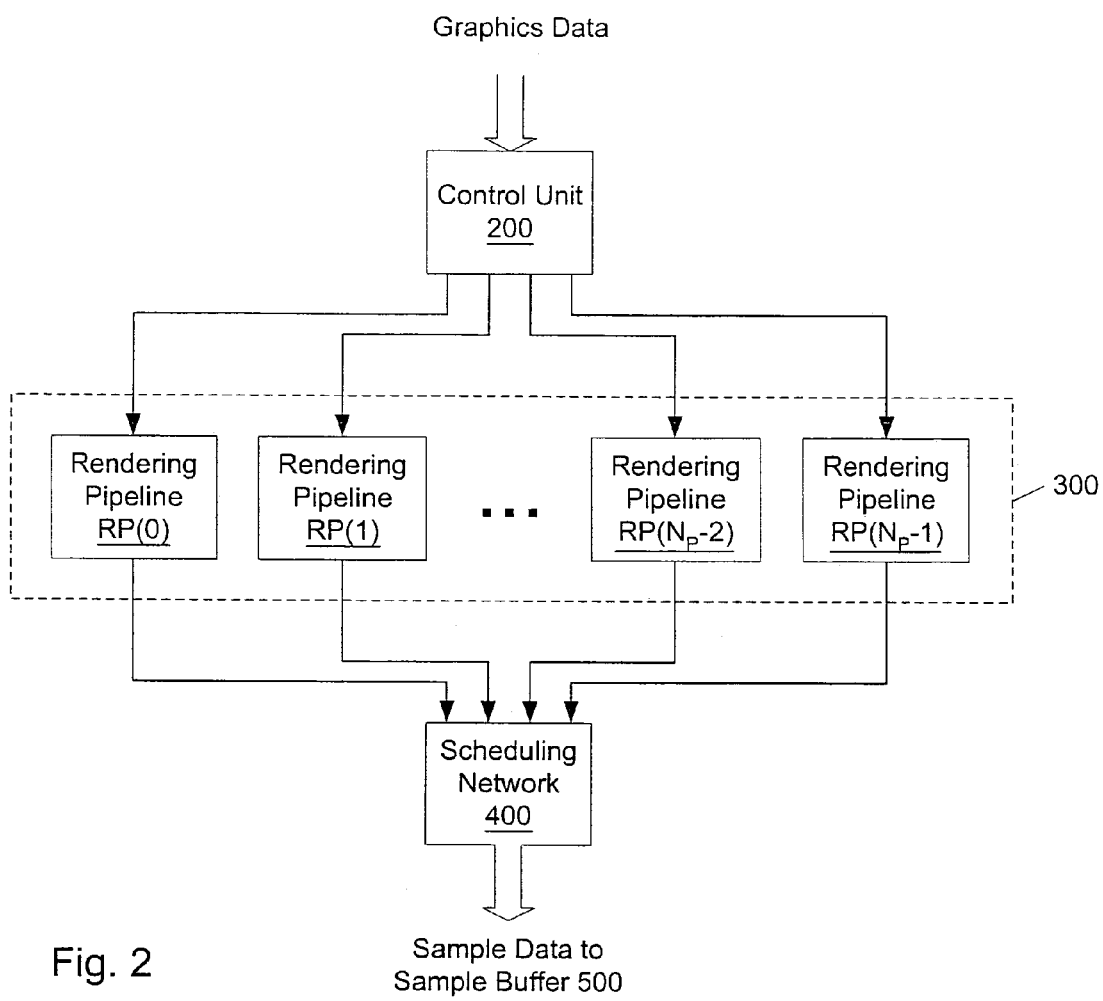
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$−1), are configured to operate in parallel. For example, in one embodiment, $N_{PL}$ equals four. In another embodiment, $N_{PL}=8$.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system ~100 may be configured to generate up to $N_D$ independent video pixel streams denoted VPS(0), VPS(1), . . . , VPS($N_D$–1), where $N_D$ is a positive integer. Thus, a set of host applications (running on a host computer) may send $N_D$ graphics data streams denoted GDS(0), GDS(1), . . . , GDS($N_D$–1) to the graphics system 100. The rendering engine 300 may perform rendering computations on each graphics data stream GDS(I), for I=0, 1, 2, . . . , $N_D$–1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory), residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
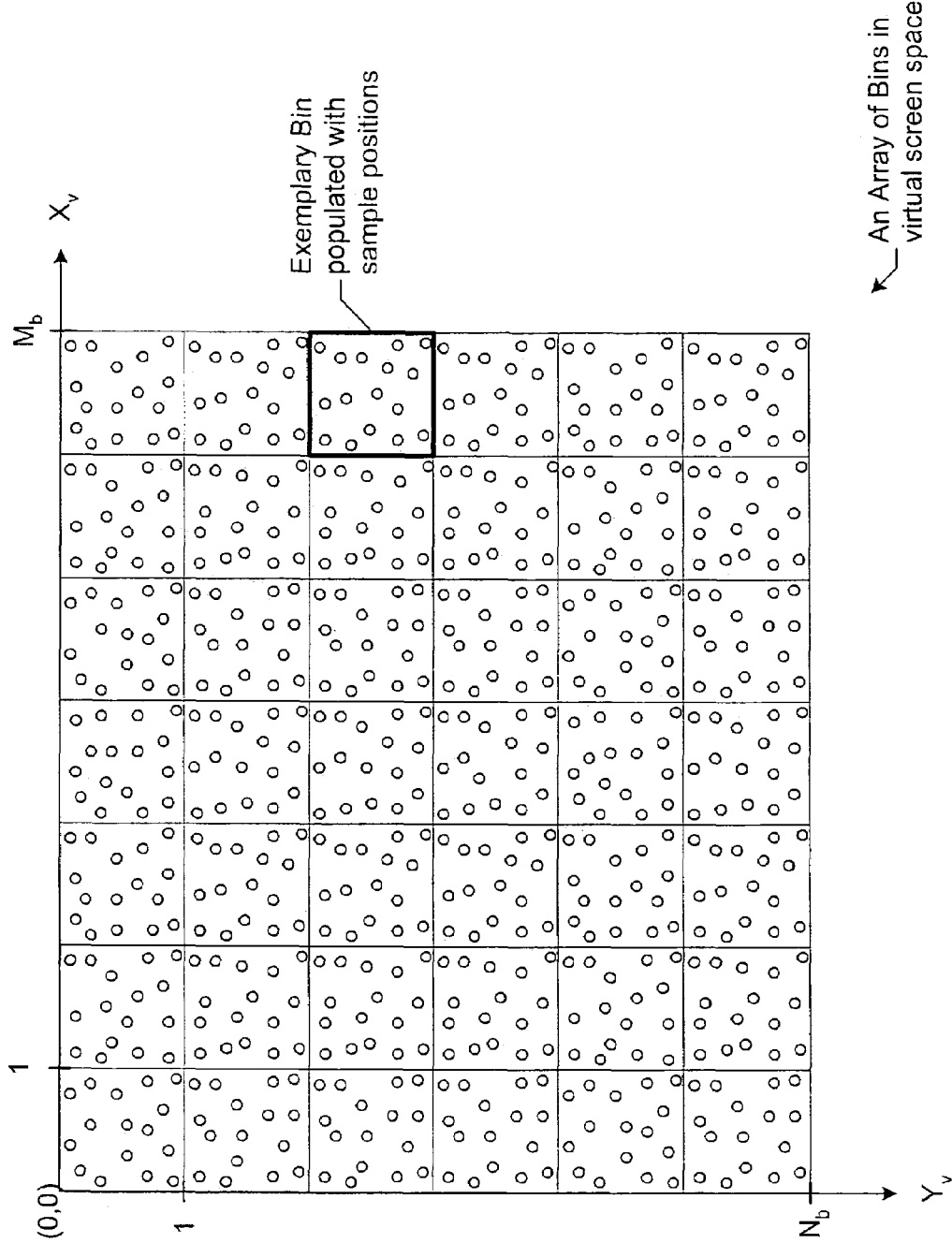
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;

(b) determine which of the $N_{s/b}$ sample positions reside interior to the primitive;

(c) compute a sample for each of the interior sample positions, and (d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
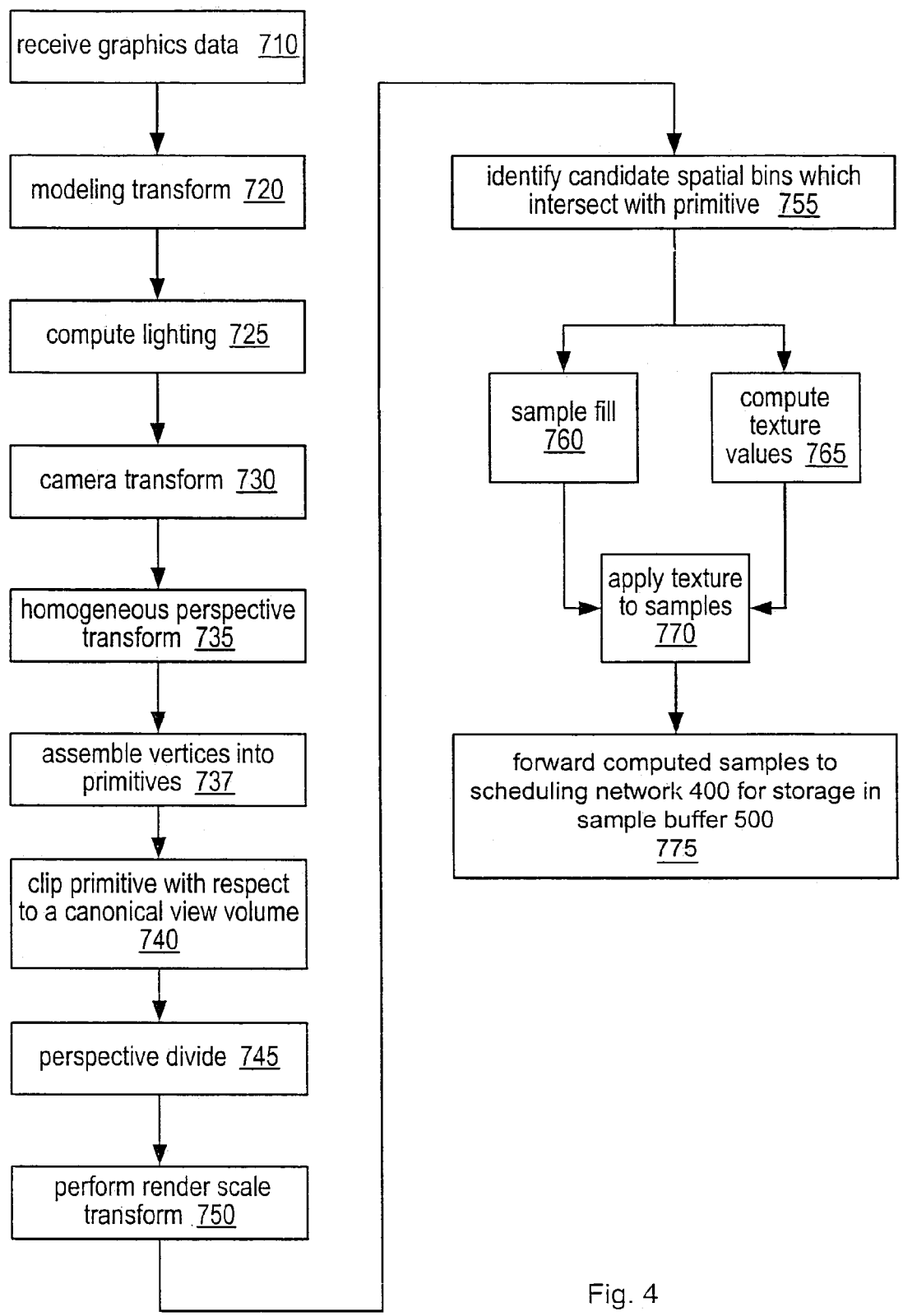
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$T1=(-W \leq X)$ $T2=(X \leq W)$ $T3=(-W \leq Y)$ $T4=(Y \leq W)$ $T5=(-W \leq Z)$ $T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X,Y,Z,W) according to the relations $x=X/W$ $y=Y/W$ $z=Z/W.$ After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_V$ and $Y_V$ denote the horizontal and vertical coordinate respectively in the virtual screen space.

Figure 5:
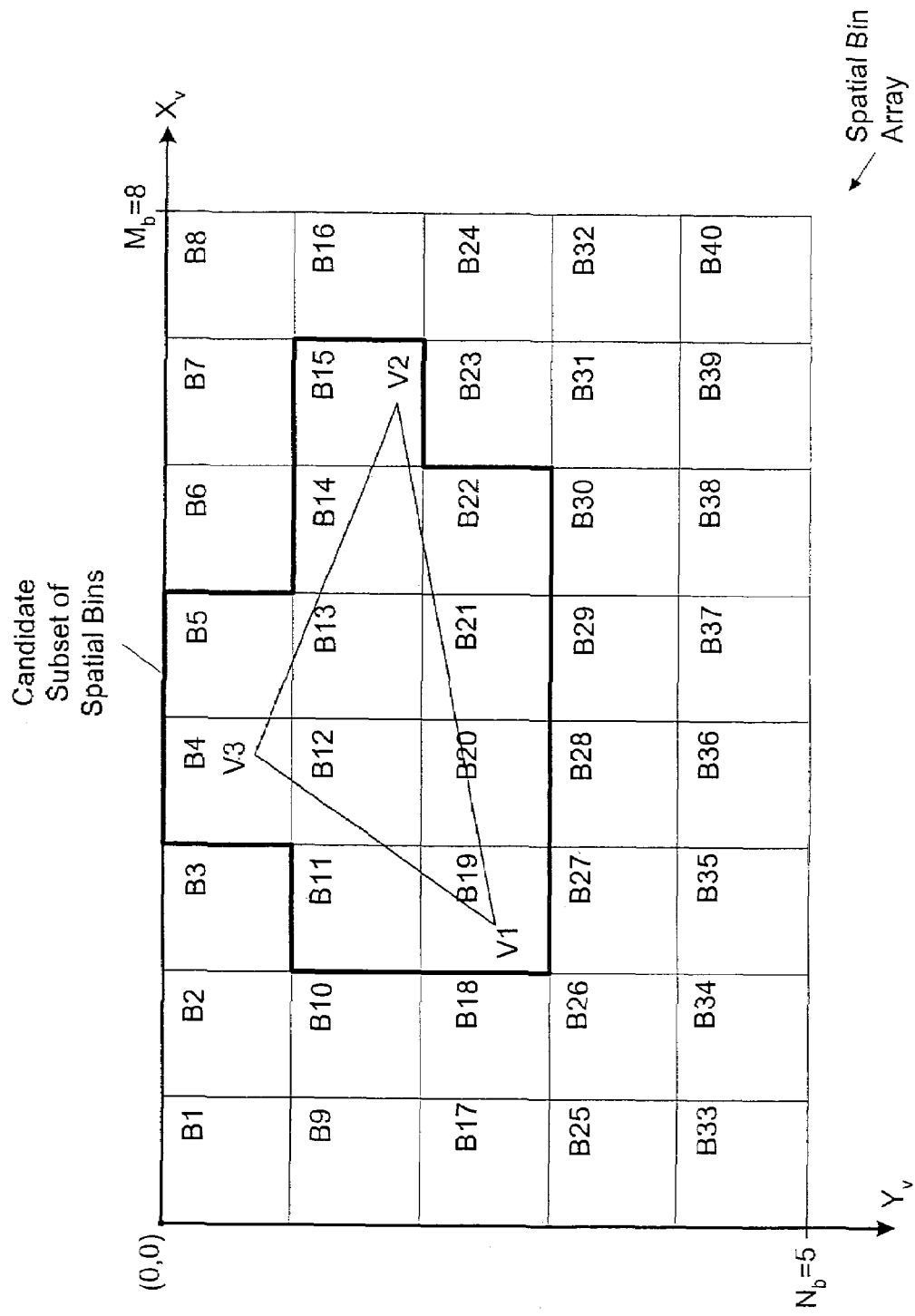
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
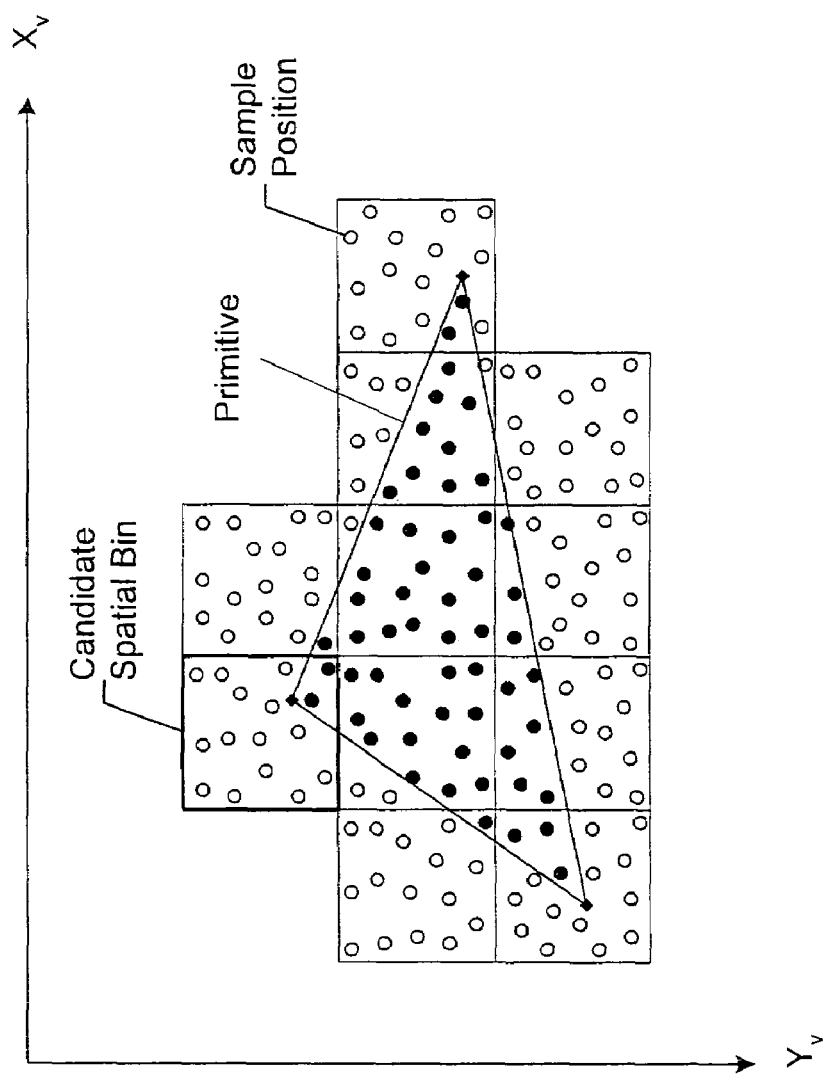
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
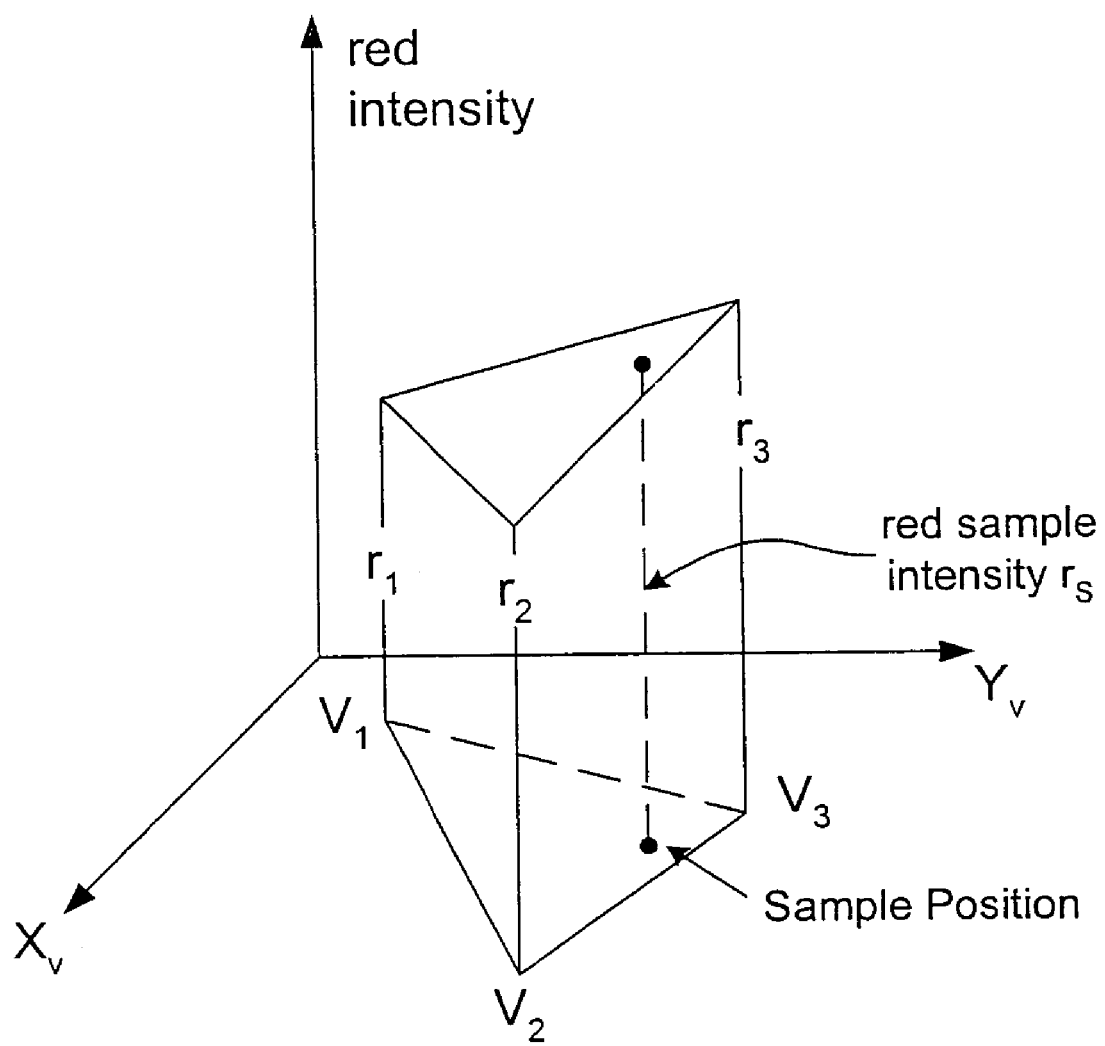
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
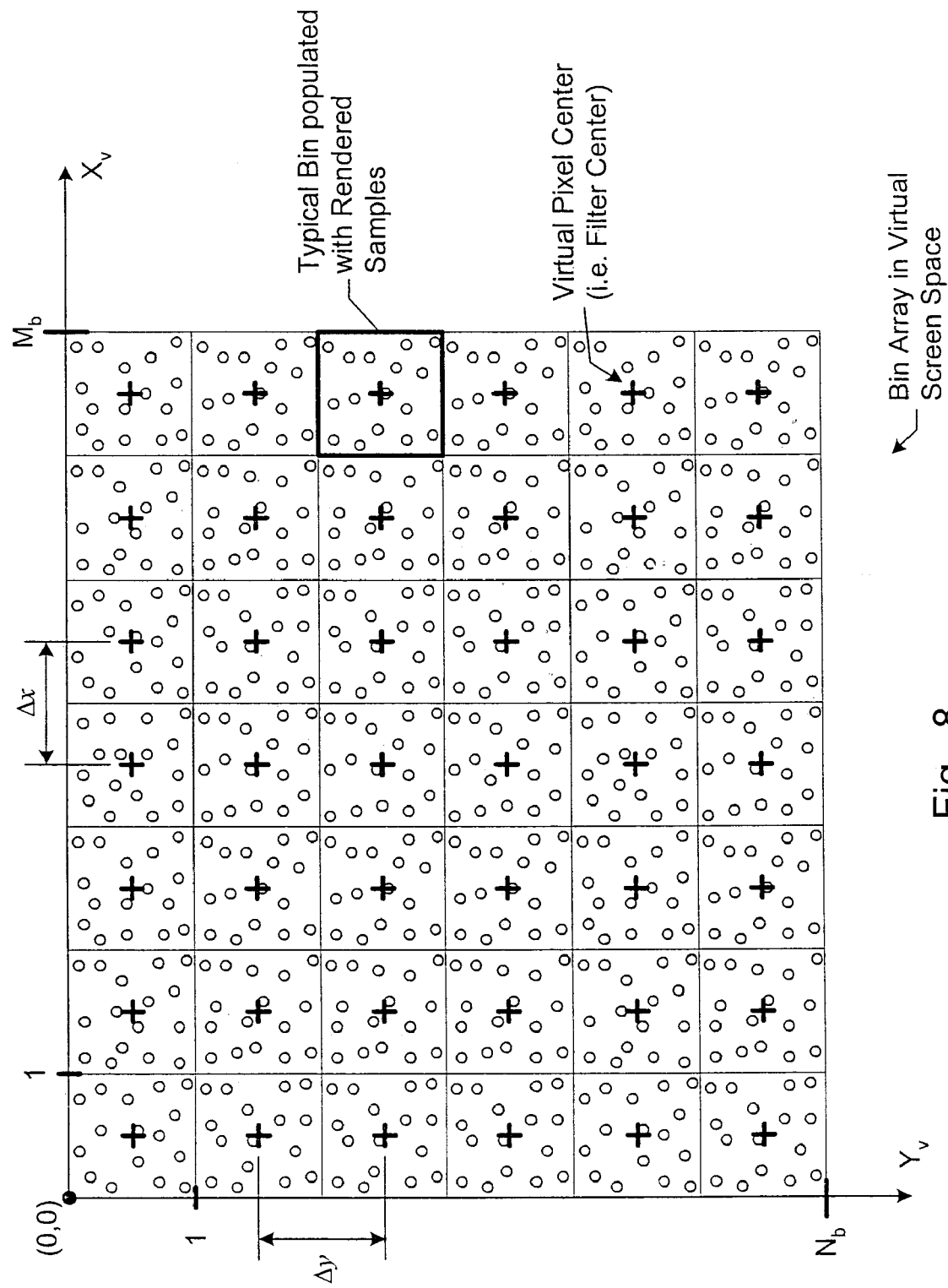
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement ΔX between successive virtual pixel positions in a row and vertical displacement ΔY between successive rows. The first virtual pixel position in the first row is controlled by a start position $(X_{start}, Y_{start})$. The horizontal displacement ΔX, vertical displacement ΔY and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement Δx and vertical displacement Δy may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
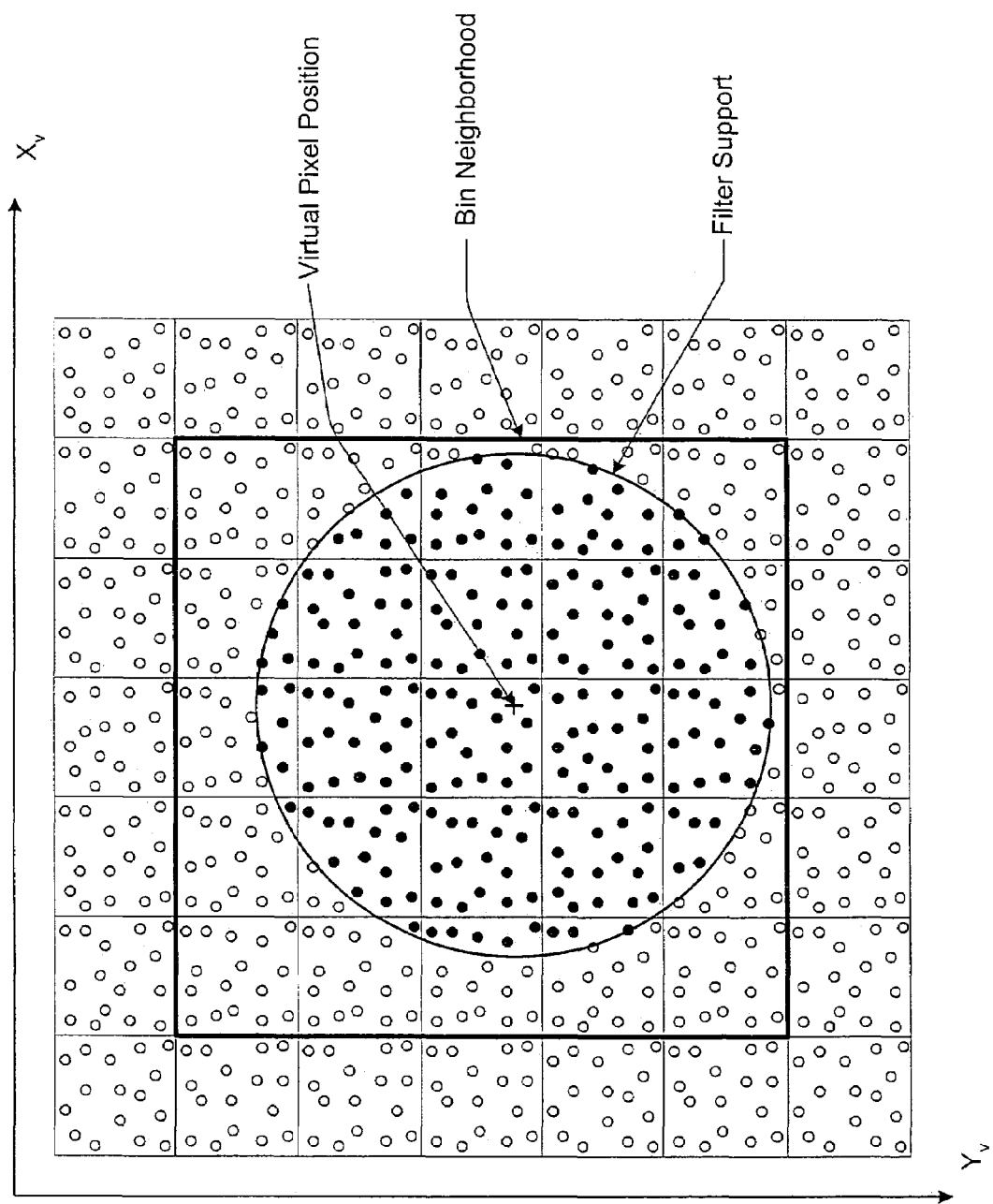
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \sum C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \sum C_S.$$

The initial pixel values may then be multiplied by the reciprocal of E (or equivalently, divided by E) to determine normalized pixel values:

$R_P=(1/E)*r_P$ $G_P=(1/E)*g_P$ $B_P=(1/E)*b_P$ $A_P=(1/E)*\alpha_P.$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D^S)^2$ of each sample position $(X_S,Y_S)$ in the bin neighborhood with respect to the virtual pixel position $(X_P,Y_P)$ according to the expression $(D_S)^2=(X_S-X_P)^2+(Y_S-Y_P)^2.$ The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$ and $Y_P-R_f$. Each sample S in the bin neighborhood may be marked as being valid if the sample's position $(X_S,Y_S)$ falls within the support square, i.e., if $X_P-R_f<X_S<X_P+R_f$ and $Y_P-R_f<Y_S<Y_P+R_f.$ Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), . . . , FU($N_f$-1) operating in *parallel*, where the number $N_f$ of filtering units is a positive integer. For example, in one embodiment, $N_f=4$. In another embodiment, $N_f=8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_p/4$ for $K=0, 1, 2, 3$. Filtering unit FU(K) may generate a stripe of pixels in a scan line fashion as follows:

```
I=0;
J=0;
X_p=X_start(K);
Y_p=Y_start(K);
while (J<N_p) {
    while (I < M_H(K) {
        PixelValues = Filtration(X_p,Y_p);
        Send PixelValues to Output Buffer;
        X_p = X_p+ΔX(K);
        I = I + 1;
    }
    X_p=X_start(K)
    Y_p=Y_p+ΔY(K);
    J=J+1;
}
```

The expression Filtration($X_P,Y_P$) represents the filtration of samples in the filter support region of the current virtual pixel position ($X_P,Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$ $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
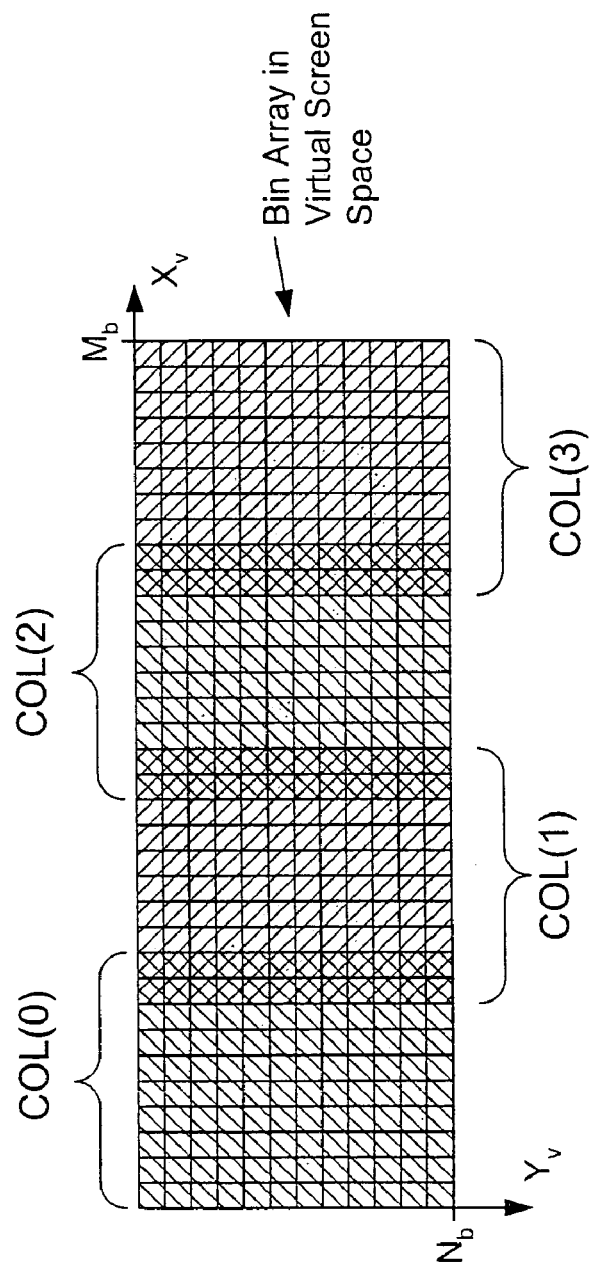
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
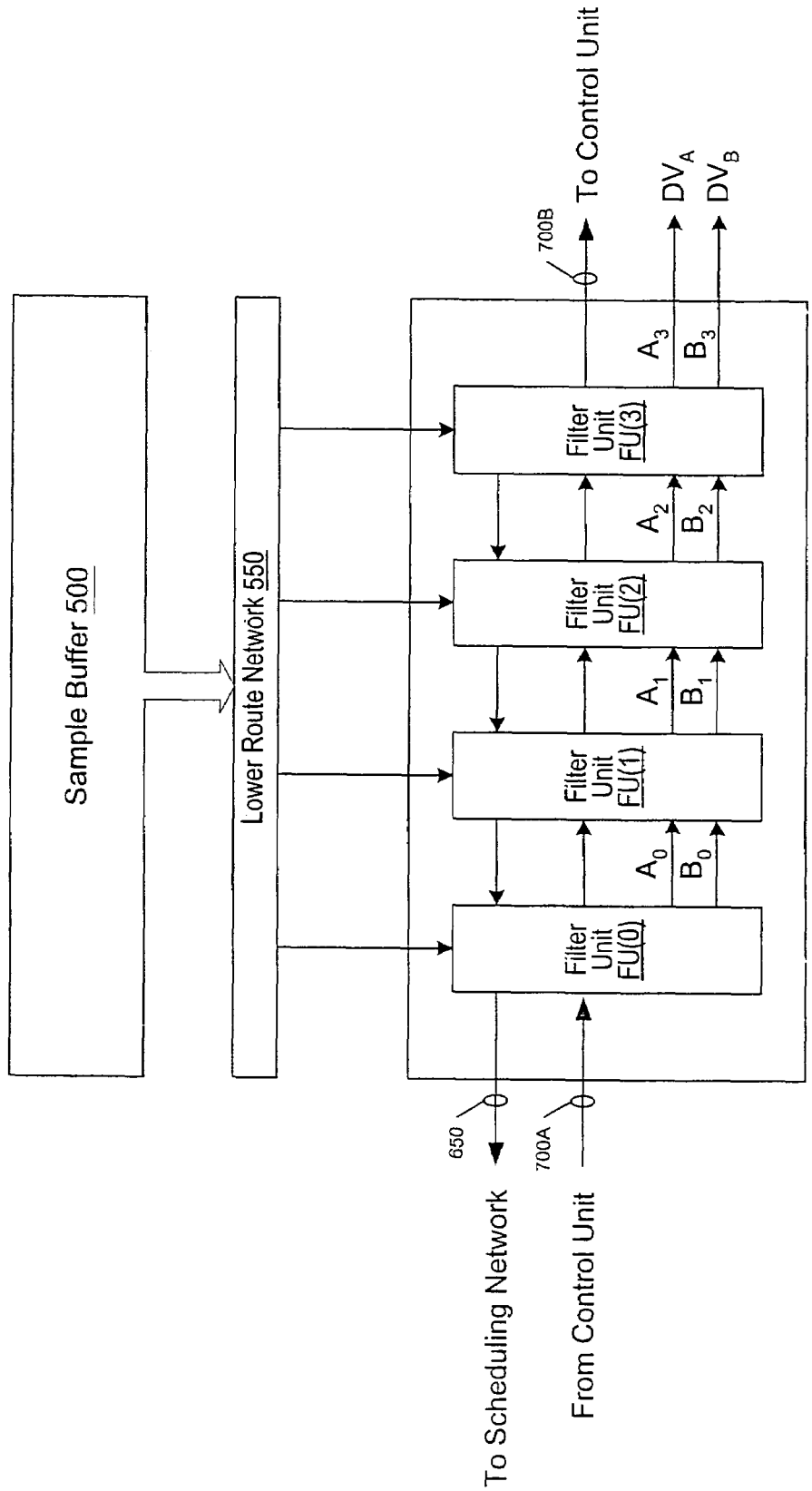
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f-1$), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f-1$) receives digital video streams $A_{Nf-2}$ and $B_{Nf-2}$ from the previous filtering unit FU($N_f-2$), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
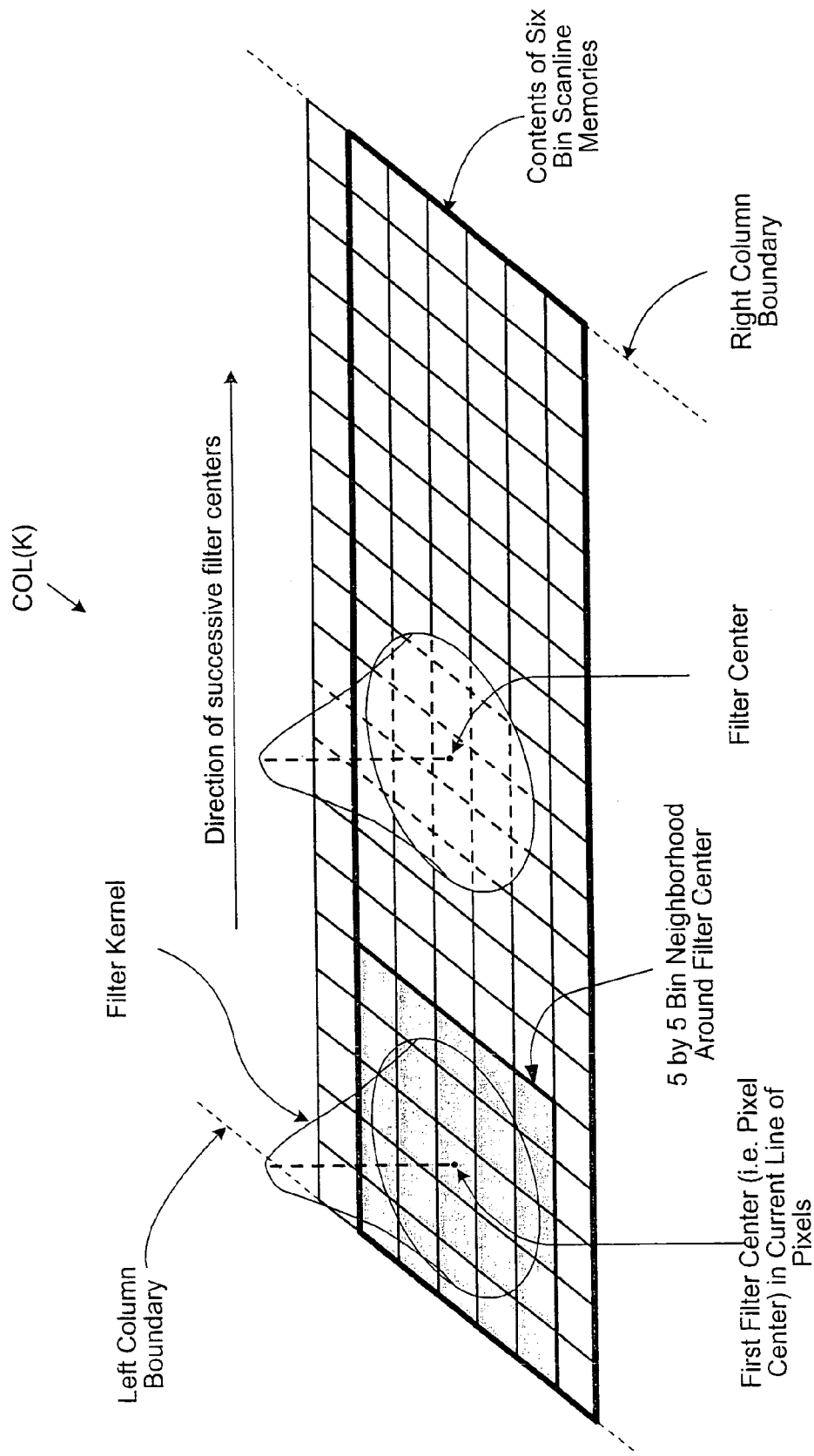
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by S neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), . . . , MB($N_{MB}$−1), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer), 30 bits of sample color (for back buffer), 16 bits of alpha and/or overlay, 10 bits of window ID, 26 bits of z depth, and 4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
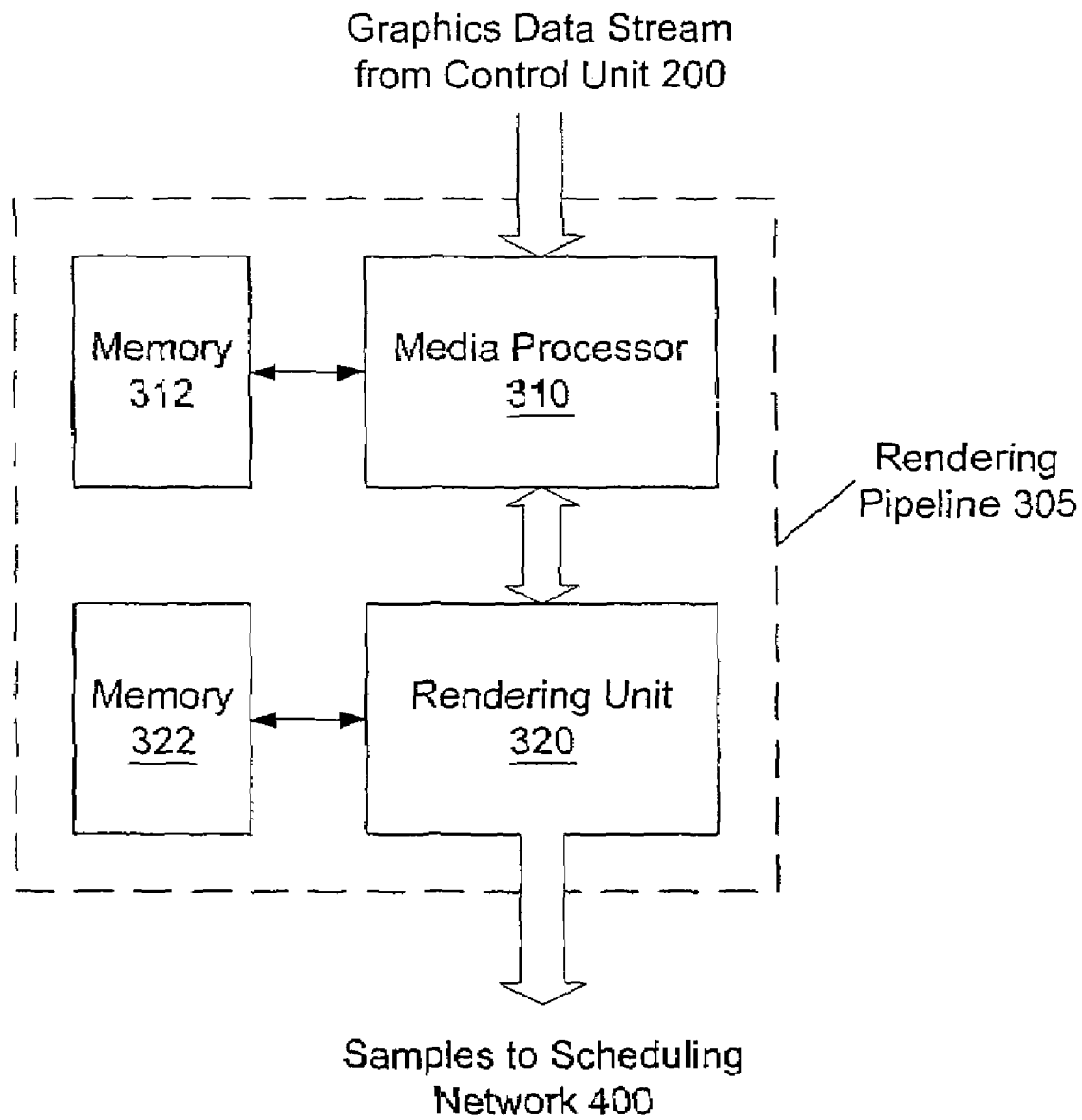
FIG. 13 illustrates one set of embodiments of a rendering pipeline comprising a media processor and a rendering unit.

As described above, the rendering engine 300 may, include a set of rendering pipelines RP(0), RP(1), . . . , RP($N_{PL}$−1). FIG. 13 illustrates one embodiment of a rendering pipeline 305 that may be used to implement any or all of the rendering pipelines RP(0), RP(1), . . . , RP($N_{PL}$−1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310' may couple to a memory 312, and may include one or more microprocessor units. The memory 312 may be used to store program instructions and/or data for the microprocessor units. (Memory 312 may also be used to store display lists and/or, vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
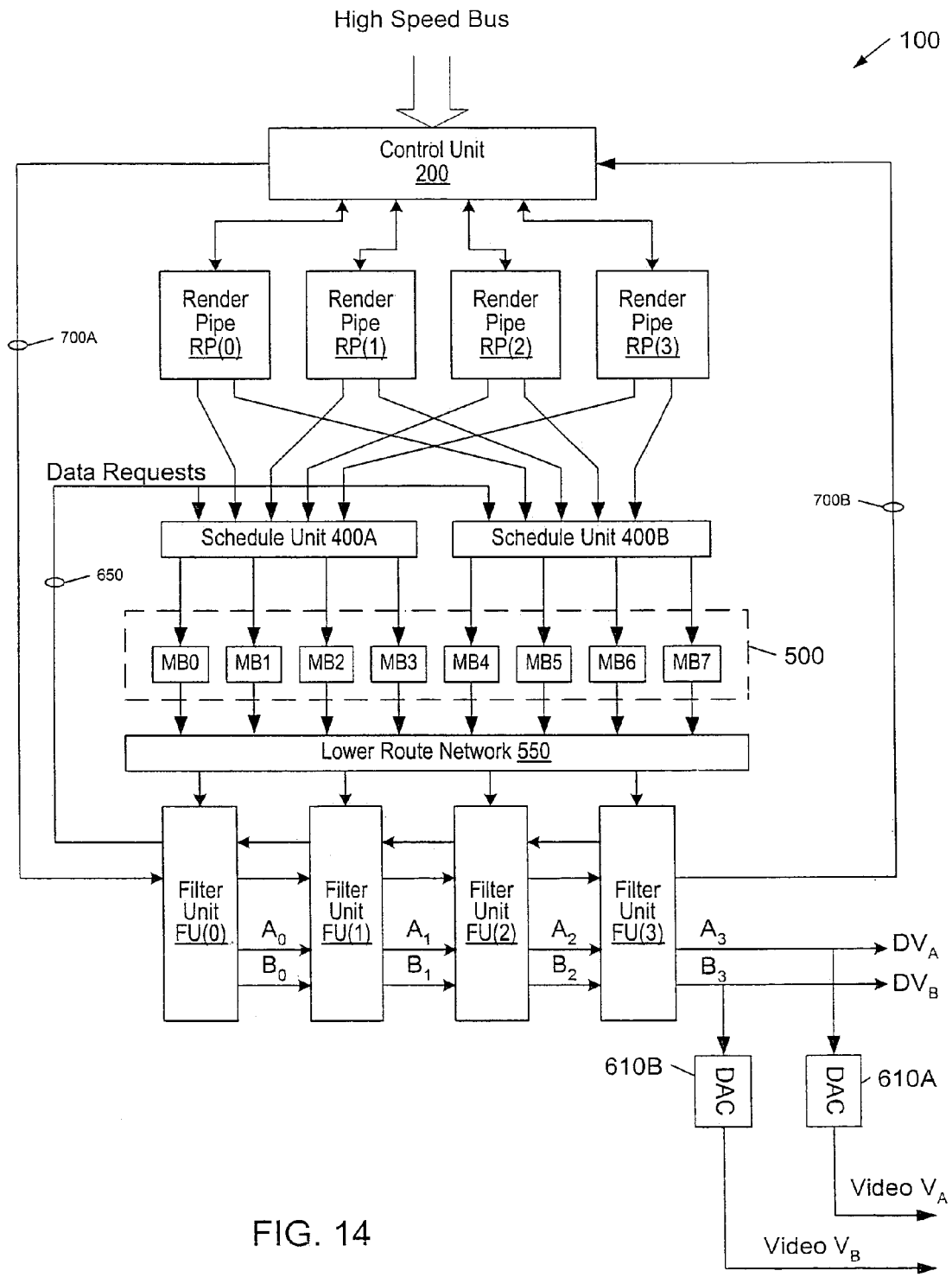
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
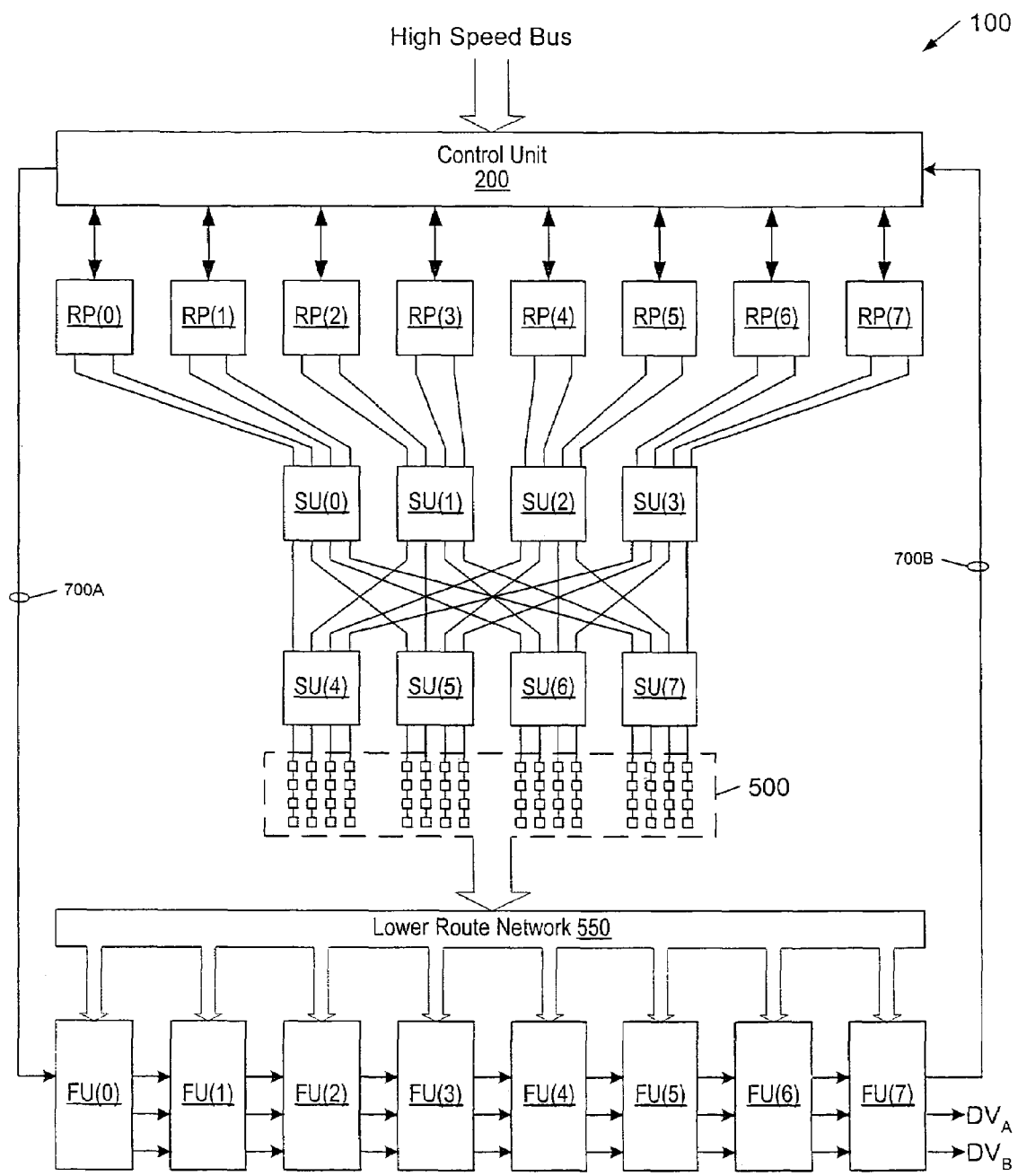
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

A host process (e.g., a graphics application program executing on a host computer system) may invoke the transfer of graphics data to the graphics accelerator 100. The control unit 200 distributes the graphics data to the rendering pipelines RP(0), RP(1), RP($N_P$−1) as suggested by FIG. 2. Each rendering pipeline RP(K) of the graphics accelerator 100 may be configured to render multi-textured triangles according to the multiple-pass methodology variously described herein.

Media Processor 310

Figure 16:
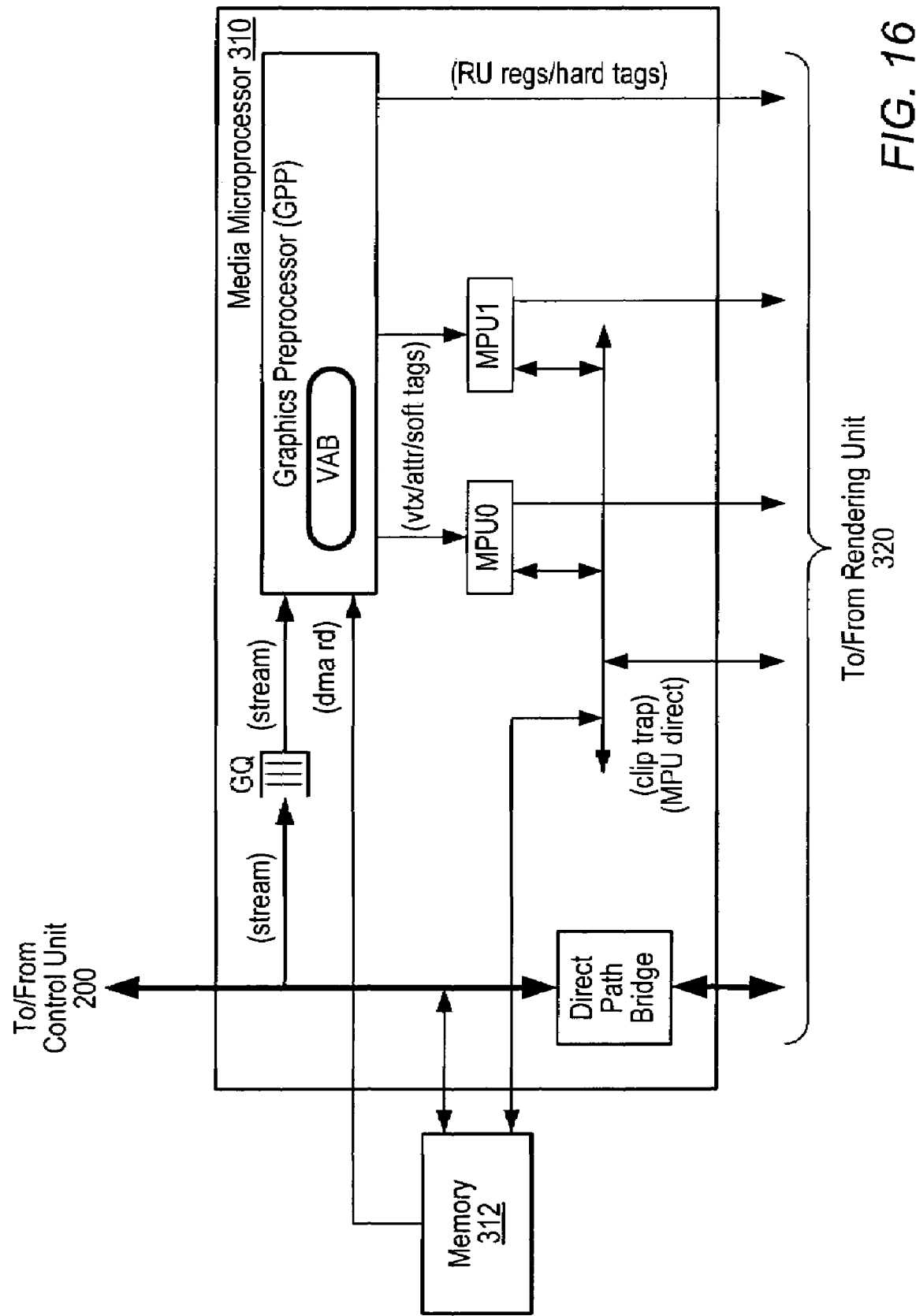
FIG. 16 illustrates one embodiment of the media processor 310.

FIG. 16 illustrates one embodiment of the media processor 310 of FIG. 13. Media processor 310 receives a stream of graphics data from the control unit 200 (as suggested by FIGS. 2 and 13). The graphics data may be buffered in graphics stream queue (GQ), and then forwarded to graphics preprocessor (GPP). The received graphics data may include vertex instructions that define graphics primitives (such as triangles, lines and dots). The graphics preprocessor GPP may be configured to decompress the vertex instructions in order to recover vertex data components, to assemble the vertex data components into vertices, to dispatch the vertices to the microprocessor units (MPUs), and to send vertex and attribute tags and/or register data to rendering unit 320. The microprocessor units may be programmed to perform vertex transformation, lighting calculations, and various other functions (such as triangle subdivision), and to send the resultant vertices to rendering unit 320. The microprocessor units may also have read/write access to texels (i.e., the smallest addressable unit of a texture map) through the rendering unit 320. A host process executing on a host computer may download program code for the microprocessor units to the media processor 310. Memory 312 may be used for program and/or data storage, for the microprocessor units. Memory 312 may also be used to store display lists and/or vertex texture maps.

Rendering Unit 320

Figure 17:
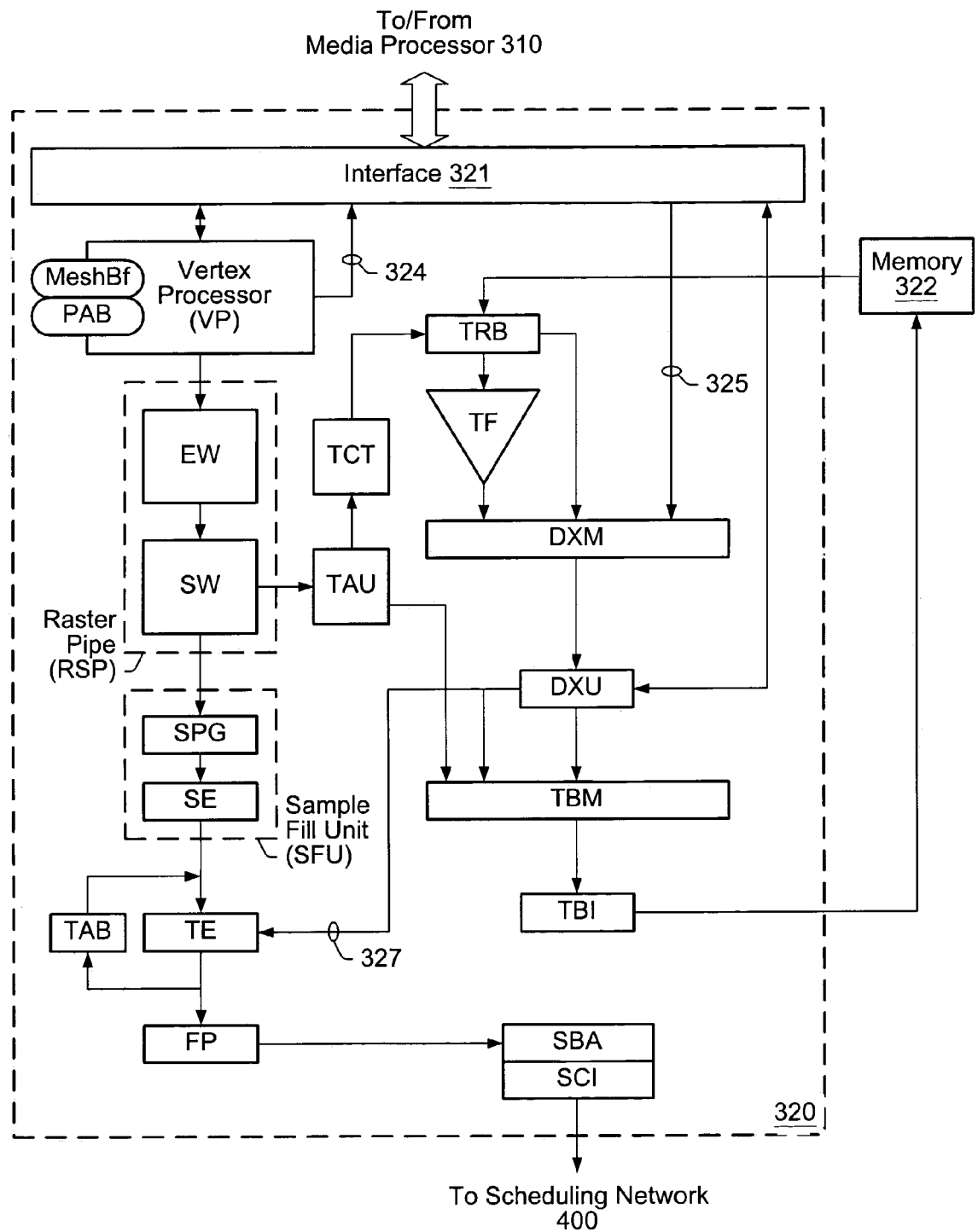
FIG. 17 illustrates one embodiment of the rendering unit 320.

FIG. 17 illustrates one embodiment of the rendering unit 320 of FIG. 13. Rendering unit 320 may include an interface 321 for communicating with media processor 310. Interface 321 may receive graphics data from media processor 310, and forward the graphics data to vertex processor VP, data transfer multiplexor DXM, and/or, data transfer unit DXU.

Vertex processor VP may receive a stream of vertices from the media processor 310 via interface 321 and assemble the vertices into distinct triangles. (The vertices carry connectivity information that specifies how the vertices are to be assembled into triangles.) In the assembly process, vertices may be saved in and/or retrieved from a mesh buffer (denoted as MeshBf in the FIG. 17).

The vertex processor VP may compute parameters for each triangle, i.e., parameters that may be used by processing operations further downstream. In one set of embodiments, the vertex processor VP may compute, for each triangle, parameters such as the edge slopes, vertical and horizontal rates of change of red, green, blue, alpha, Z and texture coordinates.

Suppose that a triangle T has vertices at positions $V_1$, $V_2$ and $V_3$ in virtual screen space, where $V_I=(X_I,Y_I)$ for $I=1,2,3$, where $X_I$ and $Y_I$ are the virtual screen space coordinates of vertex position $V_I$. In response to receiving triangle T, the vertex processor VP may be configured to compute directed edges $E_{12}$, $E_{23}$ and $E_{31}$ as follows:

$$E_{12}=V_2-V_1,$$

$$E_{23}=V_3-V_2,$$

$$E_{31}=V_1-V_3.$$

In terms of horizontal and vertical components, the vertex processor VP may compute $$dX_{12}=X_2-X_1,\ dY_{12}=Y_2-Y_1,$$

$$dX_{23}=X_3-X_2,\ dY_{23}=Y_3-Y_2,$$

$$dX_{31}=X_1-X_3,\ dY_{31}=Y_1-Y_3,$$

where $E_{IK}=(dX_{IK},dY_{IK})$.

After having computed the direct edges, the vertex processor VP may determine, for each edge $E_{IK}$, which of the component displacements $dX_{IK}$ and $dY_{IK}$ has a larger absolute value. In other words, the vertex processor VP may compute, for each directed edge $E_{IK}$, a control bit $C_{IK}$ according to the expression $C_{IK}=(|dX_{IK}|\geq|dY_{IK}|)$ ? 0:1. Each directed edge $E_{IK}$ is said to have a major axis and a minor axis. The major axis for the directed edge $E_{IK}$ is the X axis if control bit $C_{IK}$ equals zero, and the Y axis if the control bit $C_{IK}$ equals one.

After having computed the control bits, the vertex processor VP may compute, for each directed edge $E_{IK}$, a major axis coordinate $dJ_{IK}$ and a minor axis coordinate $dN_{IK}$ according to the expressions: $dJ_{IK}=C_{IK}?dX_{IK}:dY_{IK}$ and $dN_{IK} = C_{IK} ? dY_{IK} : dX_{IK}$. (These computations may be implemented by a set of multiplexors.)

Figure 18:
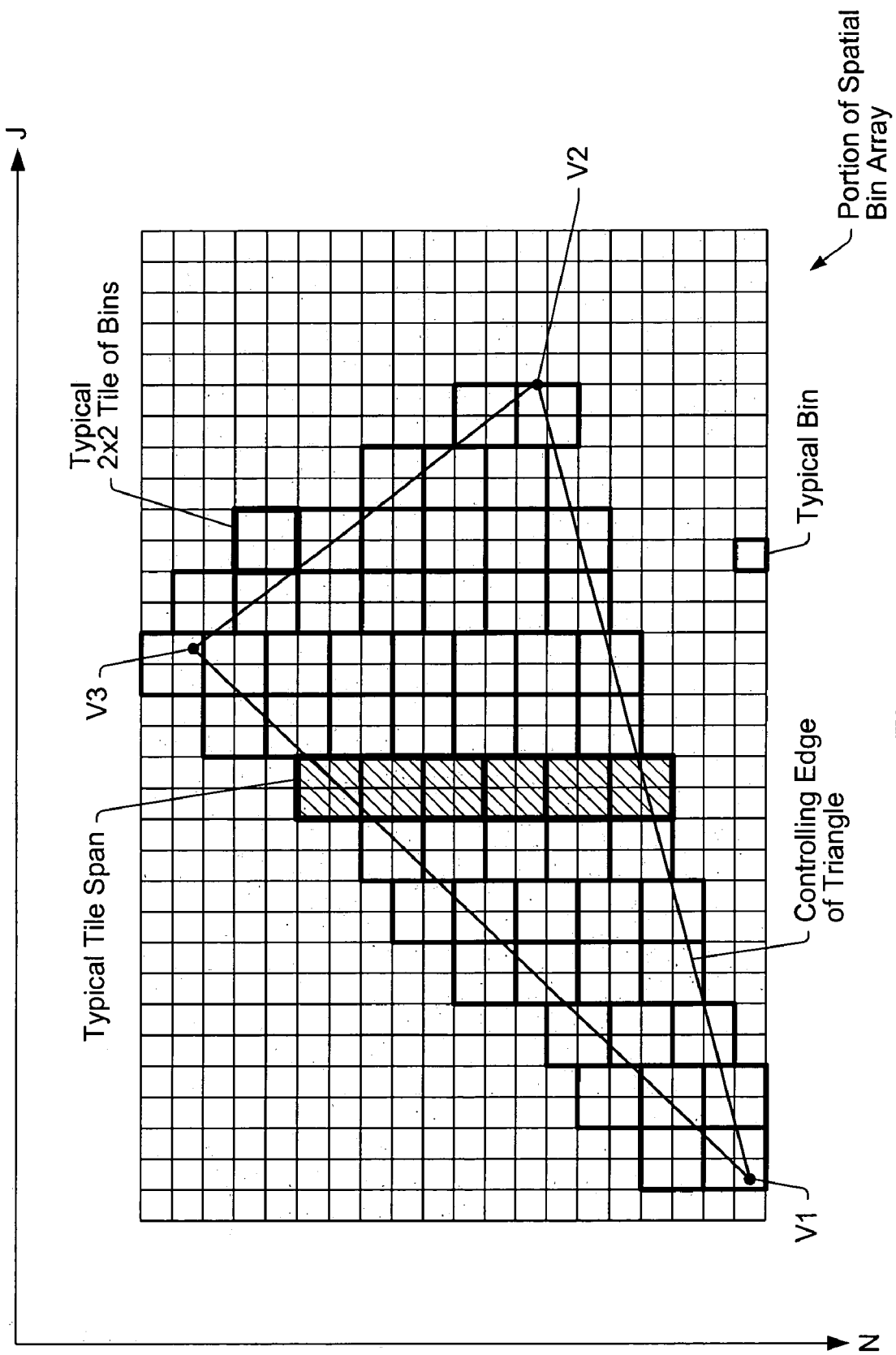
FIG. 18 illustrates a triangle covered by a series of tile spans.

In one set of embodiments, the edge walker EW and span walker SW are configured to traverse a triangle with successive tile spans as suggested by FIG. 18. A tile is an L×M rectangle of spatial bins. FIG. 18 illustrates the L=M=2 case. A tile span is a line of bins that extends from a controlling edge of the triangle to an opposing edge of the triangle. The set of tiles generated by the edge walker and span walker in said traversal covers the triangle as suggested by FIG. 18. A typical one of the tile spans is denoted in cross hatch. The edge walker EW and span walker SW are collectively referred to as the rasterization pipe (RSP).

The controlling edge is the edge which has the largest $L^\infty$ length, i.e. length measured in the sense of the $L^\infty$ norm. The $L^\infty$ norm of a vector is the maximum of the absolute values of the respective components of the vector. In other words, the controlling edge is the edge $E_{IK}$ whose absolute major displacement $|dJ_{IK}|$ is largest.

The edge walker EW may walk along the controlling edge and the opposite edge(s) computing data that defines the extent of each tile span. This data is referred to herein as span boundary data. The span walker SW may receive the span boundary data for a tile span from the edge walker EW, and walk the tile along the tile span from the controlling edge to the opposite edge based on the span boundary data. A bin that geometrically intersects that triangle is said to be a candidate bin. For each candidate bin B in each tile of the tile span, the span walker SW may compute a set $S_B$ of sample fill parameters and a texture coordinate vector $VEC_B$. The span walker may forward the set $S_B$ of sample fill parameters to a sample fill unit SFU to induce the generation of samples for the candidate bin B, and forward the texture coordinate vector $VEC_B$ to the texture address unit TAU to induce the generation of texture values for the candidate bin B.

The sample fill unit SFU may use the sample fill parameters $S_B$ to interpolate sample components such as red, green, blue, alpha and Z at any sample positions in the intersection of the triangle and the candidate bin B.

In one set of embodiments, the sample fill unit SFU includes a sample position generator SPG and a sample evaluator SE as shown in FIG. 17. The sample position generator SPG may generate sample positions within the candidate bin B. The sample evaluator SE may determine which (if any) of the sample positions in the candidate bin reside interior to the current triangle. Furthermore, the sample evaluator SE may interpolate sample component values such as red, green, blue, alpha and Z at each of the interior sample positions using the sample fill parameters $S_B$ and other pre-computed parameters (such as the horizontal and vertical rates of change of the color components, alpha and Z). The collection of sample components corresponding to an interior sample position is referred to herein as a sample. The samples corresponding to the candidate bin B may be forwarded to the texture environment unit TE.

One or more layers of texture information and/or other image information may be stored in memory 322. The texture address unit TAU may receive the texture coordinate vector $VEC_B$ corresponding to the candidate bin B from the span walker SW, and generate a set of one or more read addresses (in the address space of memory 322) in response to receiving the texture coordinate vector. The texture buffer interface TBI uses the read addresses to induce the transfer of corresponding texels (or groups of texels) to texture read buffer TRB. The texture read buffer TRB serves as a cache for texels. Texture filter TF may access texels from the texture read buffer TRB and filter (e.g., perform linear, bilinear, or trilinear filtering on) the texels to generate one or more texture values for the candidate bin B. (The texture coefficient table TCT stores texture coefficients for the texture filtering operation.) The texture values may be forwarded to the texture environment unit TE through data transfer multiplexor DXM and data transfer unit DXU.

The processing units involved in the generation and transport of texture values may be interpreted as a pipeline. In the embodiment of FIG. 17, the texture processing pipeline may include the texture address unit TAU, the texture buffer multiplexor TBM, texture buffer interface TBI, memory 322, texture read buffer TRB, texture filter TF, texture coefficient table TCT, data transfer multiplexor DXM, and data transfer unit DXU.

The texture environment unit TE may apply the texture values that have been generated for the candidate bin B to the samples (especially to the color components of the samples) of the candidate bin B, thus generating modified samples. The texture environment unit TE may support any of a wide variety of computational methods for applying the texture values to the samples. In one embodiment, the texture environment unit TE includes a programmable processor. The programmable processor is operable to apply the texture values to the samples in response to execution of an arbitrary user-defined program. In another embodiment, the texture environment unit TE may include dedicated circuitry that has been optimized for a set of one or more texturing algorithms. The dedicated circuitry may include programmable registers to support user control of constants in the one or more texturing algorithms. In other embodiments, the texture environment unit may use some combination of programmable processor(s) and dedicated circuitry.

The modified samples generated by the texture environment unit may be forwarded to scheduling network 400 through the fragment processor FP, sample buffer address unit SBA and interface SCI. Alternatively, if multiple layers of texture are to be applied, the modified samples may be stored into the texture accumulation buffer TAB. The texture accumulation buffer TAB may be used as a short-term parking area for samples between the application of successive layers of texture. The TAB may have any desired storage capacity subject to fundamental limits such as limits on cost and/or die area. For example, the storage capacity of the TAB may equal any of 1024 samples, 2048 samples, 4096 samples, 5192 samples, etc.

In one set of embodiments, the TAB resides internal to the rendering unit 320. In another set of embodiments, the TAB resides external to the rendering unit 320. An external TAB may reside in its own dedicated memory (i.e., a dedicated set of one or more RAM devices that couple at least to the rendering unit 320). Alternatively, an external TAB may be allocated a portion of a memory that serves other purposes in addition to texture accumulation. For example, the system of memory devices that contain the sample buffer 500 may also be used to store the external TAB.

Multi-Texturing Methodology

In one set of embodiments, the rendering unit 320 may be configured to apply multiple layers of texture to a stream of triangles according to the following methodology:

```
For each triangle {
    For each texture layer {
        For each tile span intersecting the triangle{
            For each tile along the tile span {
                For each candidate bin in the tile {
                    Texture pipe generates texture values for the candidate bin;
                    If(first texture layer)
                        {SFU interpolates samples for candidate bin};
                    TE gets samples for candidate bin from SFU and/or TAB;
                    TE applies texture values to samples of the candidate bin;
                    If(last texture layer)
                        {TE sends updated samples to sample buffer 500}
                        Else {TE sends updated samples to TAB};
    }}}}}
```

Observe that each triangle is completely traversed once for each layer of texture. The texture environment TE stores the samples of the candidate bins in the texture accumulation buffer TAB between the application of successive texture layers. The first texture layer may be applied to the interpolated samples as received from the sample fill unit SFU resulting in updated samples. The updated samples are stored in the TAB. Each succeeding texture layer may be applied to samples as received from the TAB. Samples resulting from application of the last texture layer may be forwarded directly to the fragment processor FP for storage in sample buffer 500 via scheduling network 400 instead of being stored into the TAB again.

Note that some of the operations illustrated in the above pseudo-code may be performed in parallel and/or in a pipelined fashion. For example, the interpolation of samples in the sample fill unit may proceed in parallel with the generation of texture values in the texture pipeline.

As described above, the vertex processor VP assembles distinct triangles from the stream of vertices provided by the media processor 310. Let $N_T$ denote the number of texture layers that are to be applied to a triangle T. Thus, the triangle T has $N_T$ sets of texture coordinate data per vertex.

In response to having assembled the triangle T, the vertex processor VP may send to the raster pipe RSP a sequence of $N_T$ single-layer triangles. Each single-layer triangle has the same set of vertex positions as triangle T, but includes texture coordinate information for a different one of the $N_T$ texture layers $L_0, L_1, \ldots, L_{NT-1}$ stored in texture memory 322. Thus, the span walker SW ends up traversing the same geometric triangle once for each of the texture layers $L_0, L_1, L_2, \ldots, L_{NT-1}$.

In the $K^{th}$ traversal, corresponding to the $K^{th}$ single-layer triangle, the span walker SW may transmit:

(a) a texture request including a texture coordinate vector referencing the texture layer. $L_K$ to texture address unit TAU, and optionally, (b) a sample fill request including sample fill parameters to the sample fill unit SFU, for each candidate bin of each tile of each tile span as described above. In some embodiments, the sample fill requests may be transmitted only in the first traversal correspond to the first texture layer. As described above, the texture data for each texture layer is accumulated onto the samples of the triangle in the texture environment unit TE.

Please refer to the following patent applications for additional teachings on the subject of multi-texturing of graphical primitives:

U.S. patent application Ser. No. 09/861,468, filed on May 18, 2001, entitled "Graphics Data Accumulation for Improved Multi-Layer Texture Performance", invented by Lavelle et al.; and U.S. patent application Ser. No. 09/861,192, filed on May 18, 2001, entitled "Graphics Primitive Size Estimation and Subdivision for Use with a Texture Accumulation Buffer", invented by Lavelle et al.

Each of these patent applications is hereby incorporated by reference in its entirety as though fully and completely set forth herein.

TAB Triangle Subdivision

As indicated above, the number of samples that get stored into the TAB equals the number $K_T$ of sample positions that reside interior to the triangle T (or the number of sample positions that are reckoned as belonging to the triangle T). In order to avoid overflowing the TAB, the vertex processor VP employs a triangle size-control algorithm that ensures that the number $K_T$ of interior sample positions (for any triangle T sent downstream to the raster pipe RSP for rendering) is less than or equal to the storage capacity of the TAB. Instead of computing the exact value of $K_T$, the vertex processor VP may compute an upper bound for the number $K_T$.

In one set of embodiments, the vertex processor VP may compute an upper bound $G_T$ for the number $K_T$ based on a sum of the geometric area of the triangle T and a scalar multiple of the triangle's perimeter. For example, the upper bound $G_T$ may be computed according to the equation:

$$G_T = (\text{geometric\_area} + 2 * \text{perimeter}) * N_{s/b},$$

where $N_{s/b}$ is the sample density (i.e., the number of sample positions per bin). The geometric area of the triangle may be computed using a cross product relation such as:

$$\text{geometric\_area} = (\tfrac{1}{2}) * |(X_1 - X_3)(Y_2 - Y_3) - (X_2 - X_3)(Y_1 - Y_3)|,$$

where |U| denotes the absolute value of U. (The multiplication by ½ may be moved inside the absolute value computation in some embodiments.) The perimeter of the triangle may be computed as the sum of the $L^\infty$ lengths of the triangle's sides:

$$\text{perimeter} = |dJ_{12}| + |dJ_{23}| + |dJ_{31}|.$$

Figure 20:
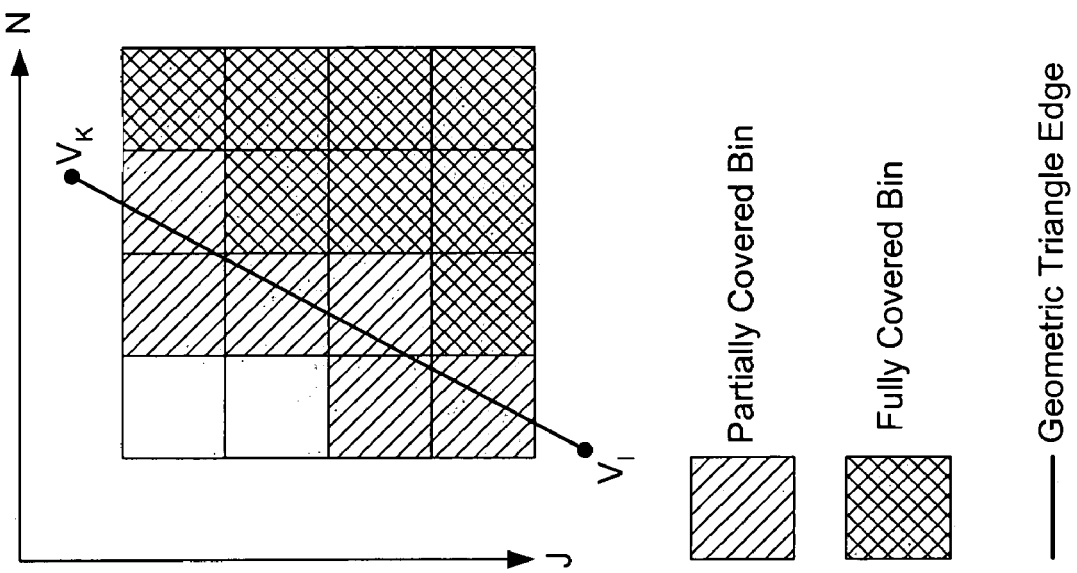
FIG. 20 illustrates how at most two partially covered bins interact with the edge $E=(V_J, V_K)$ on each bin line J=integer.
Figure 19:
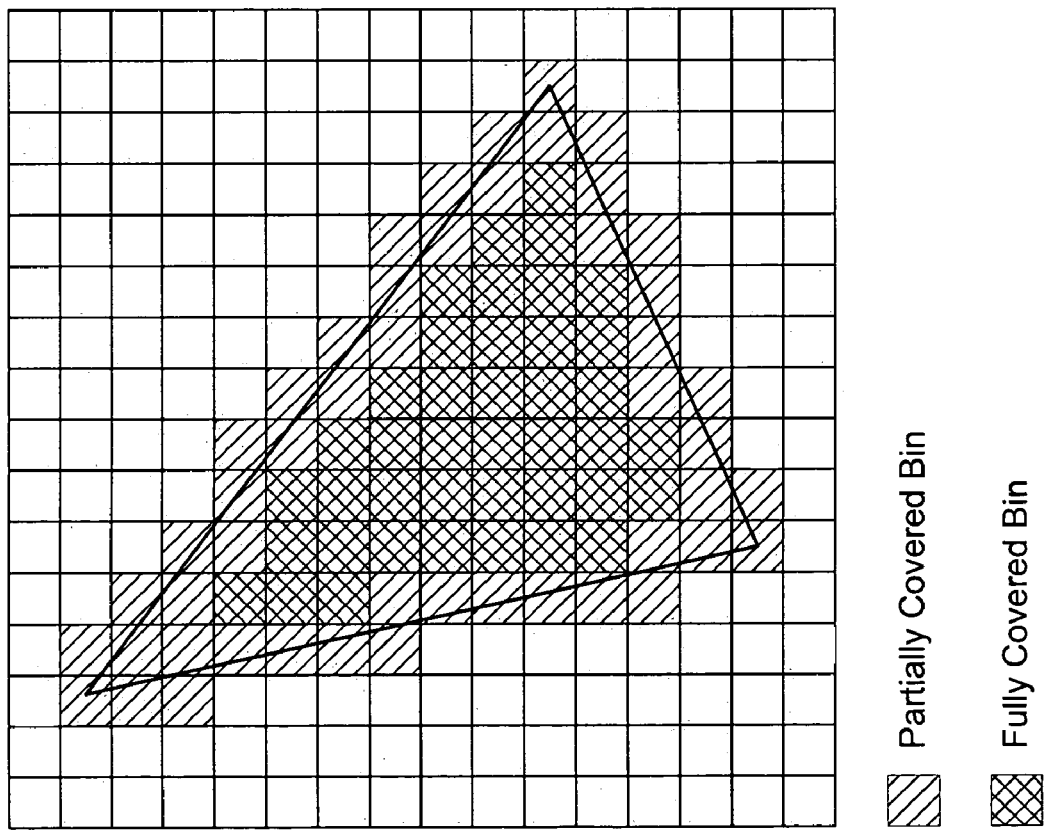
FIG. 19 illustrates the definition of a fully covered bin and a partially covered bin.

FIGS. 19 and 20 motivate the form of the expression for $G_T$. The bins that intersect the triangle T fall into two categories: bins that are fully covered by the triangle T, and bins that are partially covered by the triangle T. The number of fully covered bins is bounded above by the geometric area of the triangle (under the assumption that each bin is a 1×1 square in virtual screen space). The number of partially covered bins intersecting an edge $E_{IK}$ of the triangle is bounded above by twice the length $|dJ_{IK}|$ of the edge (i.e., length in the sense of the $L^\infty$ norm) as suggested by FIG. 20. At each integer value of the edge's major axis coordinate J, the edge $E_{IK}$ intersects at most two of the partially covered pixels in the minor axis direction.

In one embodiment, the vertex processor VP may compute the perimeter according to the relation perimeter=$dQ_{12}+dQ_{23}+dQ_{31}$, where $dQ_{IK}$=ceiling[max($J_I,J_K$)]−floor[min($J_I,J_K$)], where $J_I$ and $J_K$ are the major axis coordinates for the vertices $V_I$ and $V_K$ respectively (where major axis is interpreted as the major axis of the edge $E_{IK}$).

The estimate $G_T$ is referred to as a coverage estimate because it is based on an upper bound for the number of bins that at least partially cover the triangle T. The vertex processor VP may use the coverage estimate $G_T$ (as well as other tests) to determine when the triangle T is to be sent back to the media processor 310 for subdivision into two or more pieces. The vertex processor VP may send the triangle T back to the media processor 310 through the feedback path 324 as depicted in FIG. 17.

Figure 21:
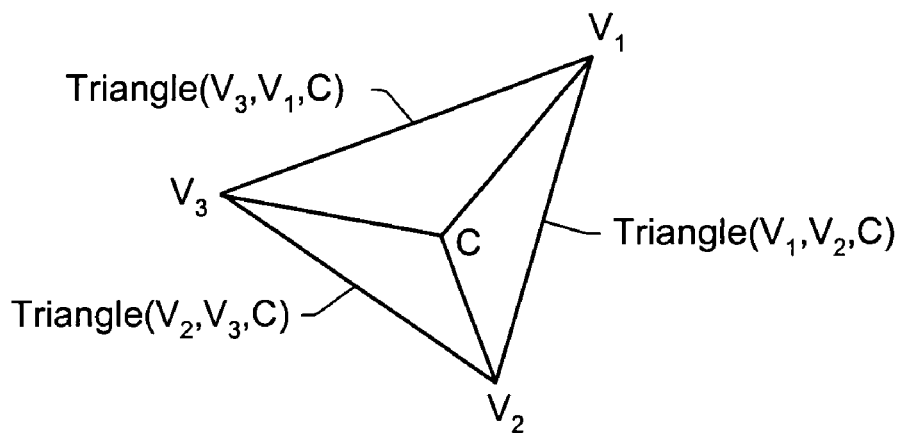
FIG. 21 illustrates one embodiment of a central subdivision process.

One subdivision algorithm employed by the media processor 310 is referred to herein as central subdivision and is illustrated in FIG. 21. In central subdivision, an interior point C of the triangle is computed, and component triangles ($V_1, V_2, C$), ($V_2, V_3, C$) and ($V_3, V_1, C$) are generated. Central subdivision drives the geometric area of the component triangles towards zero. However, note that central subdivision preserves the edges of the original triangle T; they appear as edges of the three component triangles respectively.

In one embodiment, the interior point C is the centroid C=(⅓)($V_1+V_2+V_3$). In other embodiments, other interior points may be selected.

Figure 22:
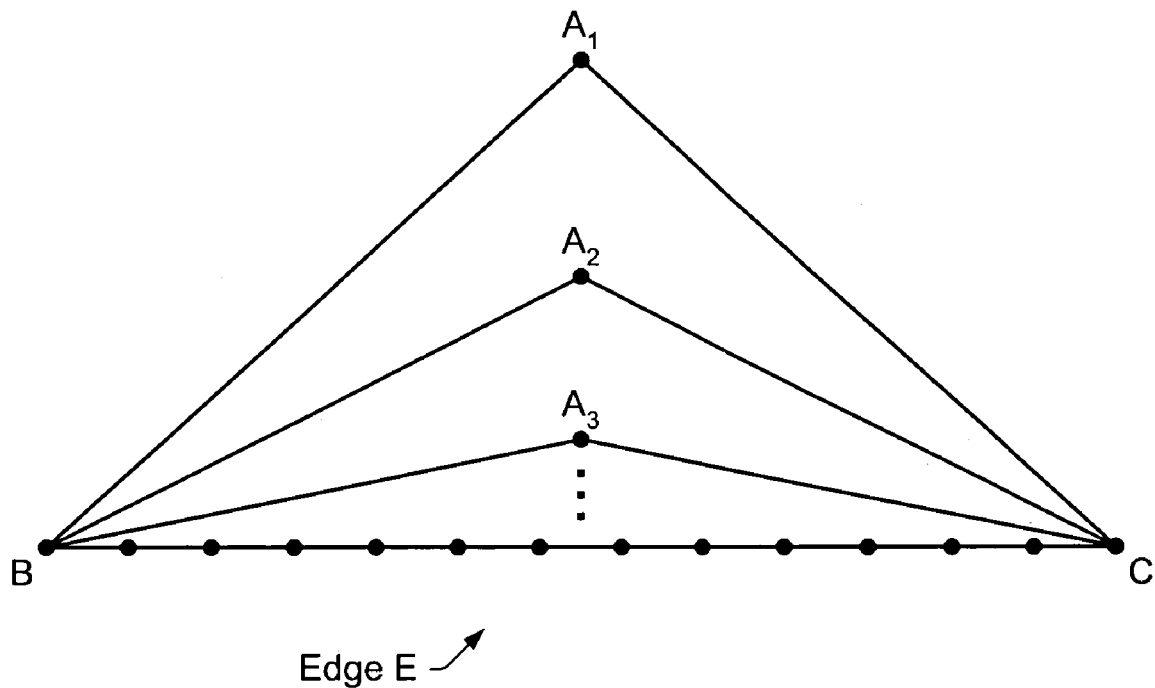
FIG. 22 illustrates a set of sample lying along (or very near) an edge E and a sequence of triangles that contain an edge E.

Suppose that a number $K_E$ of sample positions happen to lie along an edge E of the triangle T and the number $K_E$ is larger than the capacity of the TAB. Thus, the number $K_T$ of samples generated in response to triangle T is greater than or equal to $K_E$. As suggested by FIG. 22, repeated central subdivisions will not suffice to drive the sample number $K_T$ below $K_E$. The set of $K_E$ supersample positions are shown lying along the edge from vertex B to vertex C. Each of the triangles in the sequence {($A_K$, B, C), K=1, 2, 3, . . . } contains the edge E and thus retains all the samples on the edge E. Thus, the vertex processing VP calls upon one or more subdivision processes capable of splitting triangle edges, and not merely the central subdivision process.

For each edge of the triangle T, the vertex processor VP may compute a length estimate L and compare the length estimate L to a length threshold $L_{MAX}$ (also referred to as a maximum length). The length threshold may equal the sample capacity $C_{TAB}$ of the TAB divided by the square root of the sample density $N_{s/b}$:

$$L_{MAX} = C_{MAX} / \sqrt{N_{s/b}}.$$

Alternatively, the length threshold may equal any of various numbers that are proportional to the sample capacity of the TAB. If any edge of the triangle has a length greater than the length threshold, the vertex processor may send the triangle back to the media processor 310 (e.g., through feedback path 324) for subdivision according to one of the processes illustrated in FIGS. 23–25.

Figure 23:
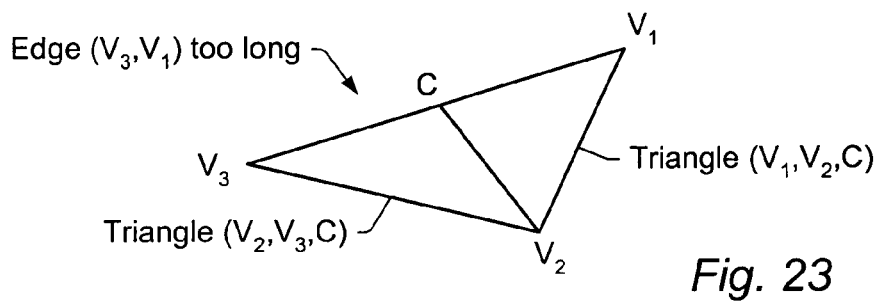
FIG. 23 illustrates a dicing method that has the effect of cutting one edge of a triangle.

FIG. 23 illustrates the situation where the triangle T=($V_1, V_2, V_3$) has exactly one edge with length greater than the length threshold. For the sake of discussion, let $E_{31}$ be the edge with super-threshold length. The media processor 310 may compute a point C on the edge $E_{31}$, and generate the two component triangles ($V_1, V_2, C$) and ($V_2, V_3, C$). In some embodiments, the point C is the midpoint of edge $E_{13}$.

Figure 24:
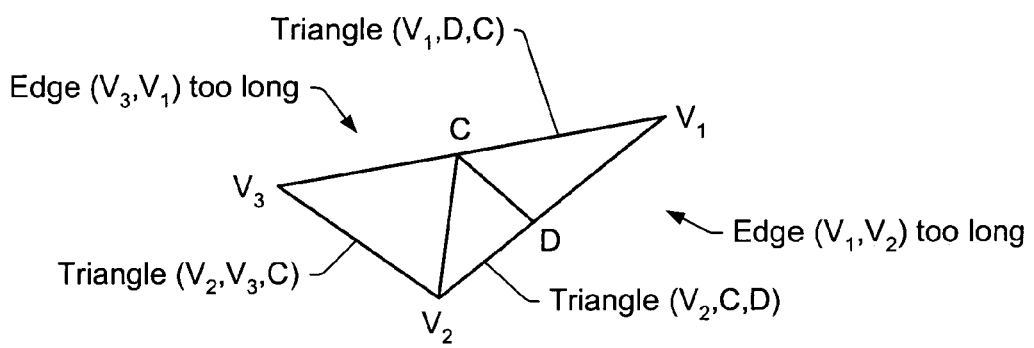
FIG. 24 illustrates a dicing method that has the effect of cutting two edges of a triangle.

FIG. 24 illustrates the situation where the triangle T=($V_1, V_2, V_3$) has exactly two edges with length greater than the length threshold. For the sake of discussion, let $E_{12}$ and $E_3$, be the edges with super-threshold length. The media processor 310 may compute a point C (e.g., a midpoint) on the edge $E_{31}$, and a point D (e.g., a midpoint) on the edge $E_{12}$. The media processor 310 may generate the three component triangles ($V_1, D, C$), ($V_2, C, D$) and ($V_2, V_3, C$). In one embodiment, the media processor 310 may compare the lengths of the super-threshold edges. If $E_{31}$ is longer than $E_{12}$, the media processor may generate the component triangles ($V_1, D, C$), ($V_2, C, D$) and ($V_2, V_3, C$). Alternatively, if $E_{12}$ is longer than $E_{31}$, the media processor 310 may generate the component triangles ($V_1, D, C$), ($V_2, V_3, D$) and ($V_3, C, D$).

Figure 25:
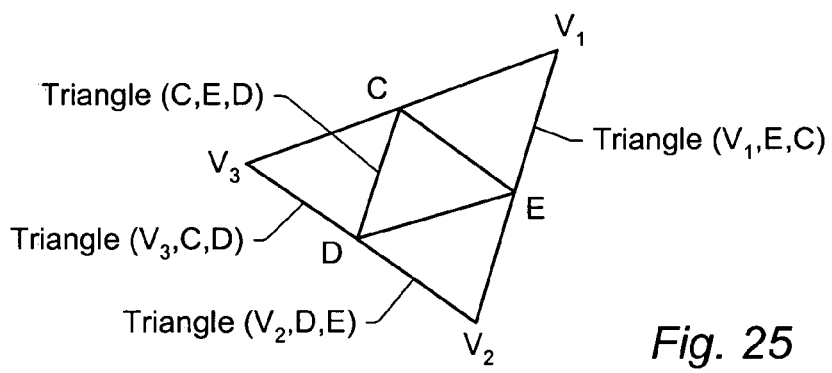
FIG. 25 illustrates a dicing method that has the effect of cutting all three edges of a triangle.

FIG. 25 illustrates the situation where all three edges of the triangle T=($V_1, V_2, V_3$) have length greater than the length threshold. The media processor 310 may compute points C, D, E (e.g., midpoints) along the edges $E_{13}$, $E_{23}$ and $E_{12}$ respectively, and generate the component triangles ($V_1, E, C$), ($V_2, D, E$), ($V_3, C, D$) and (C, E, D).

After having subdivided a triangle into component triangles by any of the subdivision methods described herein, the media processor 310 may send the vertices of the component triangles to the vertex processor VP. The vertex processor VP may rebuild the component triangles from the vertices, and subject the component triangles to testing operations (i.e., the edge length tests and the coverage test) variously described herein.

Because the Euclidean length is expensive to compute (requiring a square root), the vertex processor VP may compute the length estimate L for each edge of the triangle T using the Manhattan distance formula (i.e., based on the $L^1$ norm):

$L_{12}=|dX_{12}|+|dY_{12}|$ $L_{23}=|dX_{23}|+|dY_{23}|$ $L_{31}=|dX_{31}|+|dY_{31}|$.

In one alternative set of embodiments, the vertex processor VP may compute the length estimate L for each edge of the triangle T using the $L^\infty$ length formula:

$L_{12}$=max {$|dX_{12}|, dY_{12}|$}=$|dJ_{12}|$ $L_{23}$=max {$|dX_{23}|, |dY_{23}|$}=$|dJ_{23}|$ $L_{31}$ max {$|dX_{31}|, |dY_{31}|$}=$|dJ_{31}|$.

In this alternative set of embodiments, $L_{MAX}$ may be set equal to $(1/\sqrt{2})$ times the sample capacity of the TAB divided by the square root of the sample density $N_{s/b}$.

The vertex processor VP is configured to assemble triangles from the stream of vertices received from the media processor 310. After having assembled a triangle T, the vertex processor VP may operate on the triangle T as suggested by the following pseudocode:

```
check_triangle(T) {
    calculate length of each edge of triangle T
    if(no edges greater than L_MAX)
        {call check_coverage(T)}
    else if(one edge greater than L_MAX)
        {call dice_one_edge(T)}
    else if(two edges greater than L_MAX)
        {call dice_two_edges(T)}
    else if(three edges greater than L_MAX)
        {call dice_three_edges(T)}
}
``` where dice_one_edge( ) is the method discussed above in connection with the FIG. 23, dice_two_edges( ) is the method discussed above in connection with FIG. 24, dice_three_edges( ) is the method discussed above in connection with FIG. 25. To invoke a dicing method, the vertex processor may send the triangle T to the media processor 310 along with a code indicating which of the edges is longer than the maximum length $L_{MAX}$. The media processor 310 may determine which dicing method to perform on which edges by examining the code.

As indicated above, if none of the triangle edges are longer than $L_{MAX}$, the vertex processor VP may perform the check_coverage operation on the triangle T. In one set of embodiments, the vertex processor VP may perform the check_coverage operation in accordance with the following pseudocode:

```
check_coverage(T) {
    calculate coverage estimate G_T for triangle T
    if(coverage G_T greater than MAX_COVERAGE)
        {call central subdivision(T)}
    else
        {for (I=0; I<N_T; I++)
            {send single-layer triangle, corresponding to texture layer I
                and triangle T, to raster pipe}
        }
}
```

To invoke the central subdivision, the vertex processor VP may send the triangle T to the media processor 310 with a code indicating that none of the edges are longer than the maximum length $L_{MAX}$. As indicated above, if the triangle T has a coverage estimate $G_T$ less than or equal to the maximum coverage, the vertex processor VP sends down a sequence (or set) of $N_T$ single-layer triangles to the raster pipe, each single-layer triangle having texture coordinate information for one of the texture layers stored in the texture memory 322.

The maximum length $L_{MAX}$ and the maximum coverage may be programmable parameters (i.e., programmable by host software). The vertex processor VP may include a maximum length register and a maximum coverage register.

In one set of embodiments, rendering unit 320 is configured to operate in a non-supersampled mode. In the non-supersampled mode, the sample density is set equal to one, i.e., one sample position is generated per bin. The non-supersampled mode may allow the graphics accelerator 100 to support backward compatibility with older graphics accelerator systems that rendered directly into pixels.

Edge Contract

Figure 26:
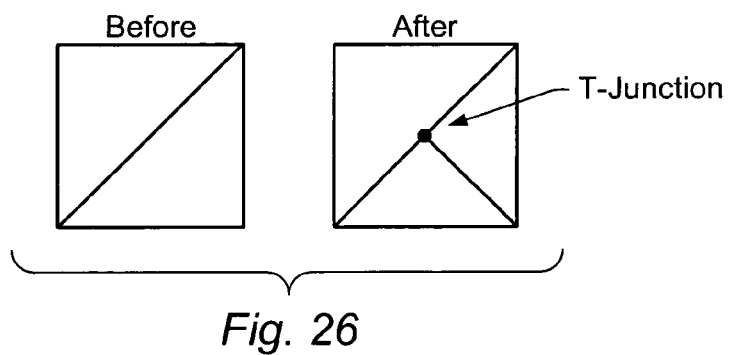
FIG. 26 illustrates two triangles sharing a common edge, and a T-junction generated by subdividing only one of the two triangles.

In the process of subdividing a triangle into component triangles, it is very desirable to avoid the formation of "T-junctions". FIG. 26 shows two triangles that share an edge. If only one of these triangles is subdivided along the common edge, the result is a "T-Junction." A "T-Junction" can result in artifacts such as cracks. The triangle size-control methodology described above avoids the formation of T-junctions by:

(1) performing the maximum edge-length test on all edges of a triangle;

(2) performing one of the dicing methods on the triangle if one or more edges fail the maximum edge-length test (i.e., have length greater than the maximum length $L_{MAX}$);

(3) performing the central subdivision only when all edges of the triangle pass the maximum edge-length test (i.e., have length less than or equal to the maximum length $L_{MAX}$).

This methodology guarantees that when two triangles share an edge E, any subdivision processes that operate on either or both of the triangles will treat the edge E in a consistent manner. If the edge E has length greater than the maximum length $L_{MAX}$, a dicing method acting on a first one of the triangles will inject a new vertex $C_1$ along the edge E. Thus, the edge E is cut into pieces from the point of view of the first triangle. The methodology guarantees that a (possibly different) dicing method acting on the second triangle will inject a new vertex $C_2$ at the same position as vertex $C_1$. Thus, the edge E is cut into the same pieces from the point of view the second triangle. If the edge E has length less than or equal to the maximum length $L_{MAX}$, any subdivision process that acts on either triangle will preserve the edge E. Therefore, no T-junctions are created, resulting in an edge-correct tessellation.

In one set of embodiments, the feedback path 324 is also used to send triangles that fail a clipping test. The vertex processor VP may implement a clipping test to determine if a triangle T has one or more vertices that lie outside a 3D view volume. If the triangle T has one or more outside vertices, the triangle T may be sent back to the media processor through the feedback path 324. The media processor 310 may then clip the triangle T into two or more triangle pieces with respect to boundaries of the view volume. The vertices of the triangle pieces are then sent down to the vertex processor VP. The vertex processor may rebuild the triangle pieces from the vertices and operate on the triangle pieces as variously described above. Thus, the feedback pathway may have a plurality of uses. In some embodiments, the clipping test is applied to a triangle before the edge length tests or the coverage test.

In one alternative set of embodiments, the vertex processor VP may be configured to perform the subdivision processes (i.e., the central subdivision process and the dicing processes) using dedicated circuitry. Thus, the subdivision of triangles may occur significantly faster than the embodiments described above where triangles are sent back to the media processor for subdivision.

Figure 27:
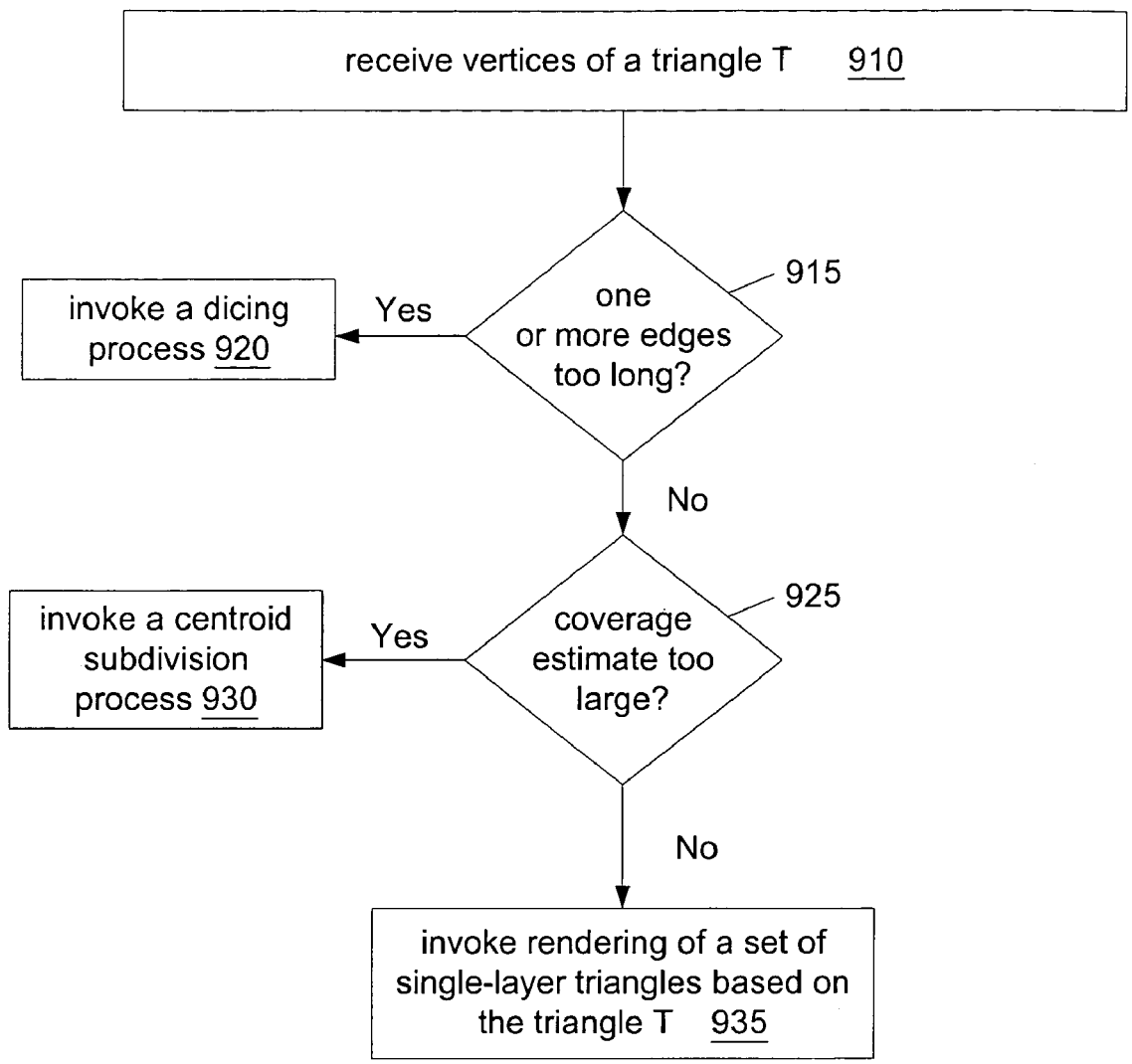
FIG. 27 illustrates a computation method for controlling the size of triangles supplied to a rasterization process.

In some embodiments, a processing system (e.g., a specialized rendering ASIC such as rendering unit 320, or alternatively, a general-purpose computer system configured to execute program code) may implement a computational method for controlling the size of triangles supplied to a rendering process as illustrated in FIG. 27. In step 910, the processing system may receive the vertices of a triangle T. In step 915, the processing system may determine if one or more edges of the triangle T have length (e.g., $L^1$ length, or $L^\infty$ length) greater than a maximum length. If the processing system determines that one or more edges have length greater than the maximum length, the processing system may invoke a dicing process on the triangle T as indicated in step 920. The dicing process may subdivide the triangle into component triangles in a manner that cuts the edges that are longer than the maximum length. If the processing system determines that none of the edges have length greater than the maximum length, step 925 may be performed.

In step 925, the processing system compares a coverage estimate for the triangle T to a maximum coverage value. If the coverage estimate is greater than the maximum coverage value, the processing system may invoke a central subdivision process on the triangle T as indicated by step 930. The coverage estimate may be computed by adding a geometric area of the triangle and a scalar multiple of a perimeter of the triangle to determine a sum, and multiplying the sum by a sample density. The central subdivision process subdivides the triangle T into component triangles in a manner that does not cut the edges of the triangle T.

If the coverage estimate is not greater than the maximum coverage value, the processing system may invoke rendering of a set of single-layer triangles based on the triangle T as indicated in step 935. Each single-layer triangle includes texture coordinate data for a corresponding layer of stored texture. The rendering of each single-layer triangle results in the application of texture information from the corresponding texture layer to samples associated with the triangle T. The samples are stored in a texture accumulation buffer between successive texture layer applications.

The various embodiments described above have focused primarily on the multi-texturing of triangles. However, it should be noted that the inventive principles described herein naturally generalize to polygons with three or more sides.

As described above, the vertex processor VP may be configured to receive a stream of vertices from the media processor 310 and to assemble triangles from the vertices using connectivity information embedded in the stream of vertices. In alternative embodiments, the vertex processor VP may be configured to receive complete (i.e., already assembled) triangles from the media processor 310. In one of these alternative embodiments, the media processor 310 may be configured to receive complete triangles from the host computer, to operate on the vertices of the complete triangles (e.g., to perform lighting computations and/or spatial transformations on the vertices) to generate modified vertices, and to forward the complete triangles including the modified vertices to vertex processor VP. In another one of these alternative embodiments, media processor 310 may be configured to receive a stream of vertices from the host computer, to operate on the stream of vertices to generate modified vertices, to assemble complete triangles from the stream of modified vertices (using connectivity information embedded in the vertices), and to forward the complete triangles to the vertex processor VP.

The methodology described above for controlling the size of triangles supplied to the rasterization pipe RSP may be applied by vertex processor VP regardless of whether or not the vertex processor assembles triangles from received vertices or receives complete triangles.

Furthermore, the methodology described above for triangle size control may be employed in graphics accelerators having a wide variety of architectures. For example, please refer to U.S. patent application Ser. No. 09/861,192, filed on May 18, 2001, entitled "Graphics Primitive Size Estimation and Subdivision for Use with a Texture Accumulation Buffer", invented by Lavelle, Morse, Oberoi, Kehlet, Wasserman, Emberling & Swanson for description of an alternative accelerator architecture in which the triangle size-control methodology may be implemented. This patent application Ser. No. 09/861,192 is hereby incorporated by reference in its entirety. The texture accumulation buffer (TAB) may reside internal or external to hardware accelerator 18 (of patent application Ser. No. 09/861,192). In the case of an external TAB, the TAB may reside in an external memory dedicated exclusively for texture accumulation, or alternatively, in a memory that has other uses as well. For example, the TAB may reside in an allocated portion of frame buffer 22 (of patent application Ser. No. 09/861,192).

Numerous variations and modifications will become apparent to those skilled in the art once the above disclosure is fully appreciated. It is intended that the following claims be interpreted to embrace all such variations and modifications.

What is claimed is:

1. A graphics system comprising:
   a rasterization pipeline;
   a vertex processor configured to receive vertices of a triangle T, to compute a first length for each edge of the triangle T, to compute a perimeter of the triangle T, to compute a geometric area of the triangle T, to add the geometric area and a scalar multiple of the perimeter to determine a coverage estimate for the triangle T, to invoke execution of a dicing process if one or more edges of the triangle T have first length greater than a maximum length, to invoke execution of a central subdivision process if the coverage estimate is greater than a maximum coverage and all edges have first length less than or equal to the maximum length, to forward a set of one or more single-layer triangles based on the triangle T to the rasterization pipeline if the triangle T has coverage estimate less than or equal to the maximum coverage and all edges have first length less than or equal to the maximum length.

2. The graphics system of claim 1, wherein samples generated in response to said forwarding of the one or more single-layer triangles to the rasterization pipeline are stored into a texture accumulation buffer (TAB) between application of successive layers of texture data, wherein the maximum coverage equals a sample capacity of the TAB.

3. The graphics system of claim 1, wherein each of said single-layer triangles contains texture information relating to a corresponding layer of texture stored in a texture memory.

4. The graphics system of claim 1, wherein, in response to receiving each of said single-layer triangles, the rasterization pipe is configured to generate a texture coordinate vector $VEC_B$ and asset $S_B$ of sample fill parameters for each candidate bin B of the single-layer triangle.

5. The graphics system of claim 4 further comprising a texture environment unit, wherein the texture environment unit is configured to receive a set of one or more texture values generated in response to the texture coordinate vector $VEC_B$, and to apply the set of texture values to samples corresponding to the candidate bin B to produce modified samples.

6. The graphics system of claim 5, wherein the texture environment unit is operable to receive the samples corresponding to candidate bin B from a texture accumulation buffer.

7. The graphics system of claim 5, wherein the texture environment unit is operable to receive the samples corresponding to candidate bin B from a sample fill unit, wherein the sample fill unit is configured to generate the samples in response to the sample fill parameters $S_B$.

8. The graphics system of claim 5, wherein the texture environment unit is configured to store the modified samples into the texture accumulation buffer.

9. The graphics system of claim 1, wherein the vertex processor is configured to compute the geometric area according to a cross product expression.

10. The graphics system of claim 1, wherein the vertex processor is configured to compute the perimeter of the triangle T as a sum of $L^\infty$ lengths of the triangle edges.

11. The graphics system of claim 1, wherein the vertex processor is configured compute the coverage estimate by multiplying the perimeter by a scalar to obtain said scalar multiple of the perimeter, adding the scalar multiple to the geometric area to form a resultant sum, and multiplying the resultant sum by a sample density.

12. The graphics system of claim 1, wherein the vertex processor is configured to invoke execution of the dicing process by sending the triangle to a programmable processor with a code indicating which of the triangle edges are longer than the maximum length.

13. The graphics system of claim 1, wherein, the vertex processor is configured to invoke execution of the central subdivision process by sending the triangle to a programmable processor with a code indicating that none of the triangle edges are longer than the maximum length.

14. The graphics system of claim 1, wherein the vertex process is configured to execute the dicing process and the central subdivision process.

15. The graphics system of claim 1, wherein the vertex processor is configured to receive the vertices in an unassembled form, and to assemble the triangle T from the vertices using connectivity information embedded in the vertices.

16. A graphics system comprising:
a means for rasterizing triangles;
a means for processing vertices, wherein said vertices processing means is configured to compute a first length for each edge of a triangle T, to compute a perimeter of the triangle T, to compute a geometric area of the triangle T, to add the geometric area and a scalar multiple of the perimeter to determine a coverage estimate for the triangle T, to invoke a dicing process if one or more edges of the triangle T have first length greater than a maximum length, to invoke a central subdivision process if the coverage estimate is greater than a maximum coverage and all edges have first length less than or equal to the maximum length, to forward a set of one or more single-layer triangles based on the triangle T to the rasterizing means if the triangle T has coverage estimate less than or equal to the maximum coverage and all edges have first length less than or equal to the maximum length.

17. A method comprising:
receiving vertices of a triangle T;
invoking a dicing process if one or more edges of the triangle T have first length greater than a maximum length;
invoking a central subdivision process if a coverage estimate for the triangle T is greater than a maximum coverage and all edges of the triangle T have first length less than or equal to the maximum length;
invoking rendering of a set of one or more single-layer triangles based on the triangle T if the coverage estimate for the triangle T is less than or equal to the maximum coverage and all edges have first length less than or equal to the maximum length;
wherein said invoking rendering of said set of single-layer triangles results in the application of a plurality of texture layers to samples corresponding to the triangle T, wherein the samples are stored in a texture accumulation buffer between the application of successive layers of said plurality of texture layers.

18. The method of claim 17, wherein the maximum coverage and maximum length are based on a sample capacity of the texture accumulation buffer.

19. The method of claim 17 further comprising:
computing the first length for each edge of the triangle T;
computing a perimeter and a geometric area of the triangle T; and
adding the geometric area and the scalar multiple of the perimeter to determine the coverage estimate for the triangle T.

20. The method of claim 17, wherein said dicing process and central subdivision process are performed in a programmable microprocessor unit in response to the execution of program code.

21. The method of claim 17 further comprising:
assembling the triangle T from the vertices using connectivity information embedded in the vertices.

22. A system comprising:
a texture accumulation buffer; and
a vertex processor configured to receive vertices corresponding to a triangle T, invoke a dicing process if one or more edges of the triangle T have first length greater than a maximum length, invoke a central subdivision process if a coverage estimate for the triangle T is greater than a maximum coverage and all edges of the triangle T have first length less than or equal to the maximum length, invoke rendering of a sequence of one or more single-layer triangles based on the triangle T if the coverage estimate for the triangle T is less than or equal to the maximum coverage and all edges have first length less than or equal to the maximum length;
wherein said invoking rendering of the sequence of single-layer triangles results in the application of a plurality of texture layers to samples corresponding to the triangle T, wherein the samples are stored in the texture accumulation buffer between the application of successive layers of said plurality of texture layers.

23. The system of claim 22 further comprising a microprocessor unit, wherein said dicing process and the central subdivision process are performed on the microprocessor unit in response to the execution of stored program code.

24. The system of claim 22 wherein the dicing processor and the central subdivision process are performed in the vertex processor.

25. The system of claim 22, wherein the vertex processor is further configured to assemble the triangle T from the vertices using connectivity information embedded in the vertices.

26. A system comprising:
a texture accumulation buffer; and
a vertex processor configured to receive vertices corresponding to a polygon, invoke a dicing process if one or more edges of the polygon P have first length greater than a maximum length, invoke a central subdivision process if a coverage estimate for the polygon P is greater than a maximum coverage and all edges of the polygon P have first length less than or equal to the maximum length, invoke rendering of a sequence of one or more single-layer polygons based on the polygon P if the coverage estimate for the polygon P is less than or equal to the maximum coverage and all edges have first length less than or equal to the maximum length;
wherein said invoking rendering of the sequence of single-layer polygons results in the application of texture data for a plurality of stored texture layers to samples corresponding to the polygon P, wherein the samples are stored in the texture accumulation buffer between the application of successive layers of said plurality of texture layers.

27. The system of claim 26, wherein the vertex processor is configured to perform the dicing process and the central subdivision process.

28. A method comprising:
(a) invoking a dicing process if one or more edges of a polygon P have length greater than a maximum length,
(b) invoking a central subdivision process if a coverage estimate for the polygon P is greater than a maximum coverage and all edges of the polygon P have length less than or equal to the maximum length.

29. The method of claim 28 further comprising:
(c) invoking an application of texture data from a plurality of stored texture layers to samples associated with the polygon P,
wherein the samples are stored in a texture accumulation buffer between the application of successive layers of said plurality of texture layers.

30. A system comprising a vertex processor, wherein the vertex processor is configured to (a) invoke a dicing process if one or more edges of a polygon P have length greater than a maximum length, and (b) invoke a central subdivision process if a coverage estimate for the polygon P is greater than a maximum coverage and all edges of the polygon P have length less than or equal to the maximum length.

31. The system of claim 30, wherein the vertex processor is further configured to (c) invoke an application of texture data from a plurality of stored texture layers to samples associated with the polygon P, wherein the samples are stored in a texture accumulation buffer between the application of successive layers of said plurality of texture layers.

32. The system of claim 30, wherein the vertex processor is configured to perform the dicing process and the central subdivision process.

33. The system of claim 30 further comprising a programmable processor operable to perform the dicing process in response to execution of program code, wherein the vertex processor is configured to invoke the dicing process by sending the polygon P to the programmable processor.

34. The system of claim 30 further comprising a programmable processor operable to perform the central subdivision process in response to execution of program code, wherein the vertex processor is configured to invoke the central subdivision process by sending the polygon P to the programmable processor.

* * * * *